(12) United States Patent
Liikanen et al.

(10) Patent No.: US 8,627,165 B2
(45) Date of Patent: Jan. 7, 2014

(54) BITWISE OPERATIONS AND APPARATUS IN A MULTI-LEVEL SYSTEM

(75) Inventors: Bruce A. Liikanen, Berthoud, CO (US); Stephen P. Van Aken, Boulder, CO (US); Gerald L. Cadloni, Longmont, CO (US); John L. Seabury, Erie, CO (US); Robert B Eisenhuth, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 1265 days.

(21) Appl. No.: 12/403,546

(22) Filed: Mar. 13, 2009

(65) Prior Publication Data

US 2009/0241006 A1    Sep. 24, 2009

Related U.S. Application Data

(60) Provisional application No. 61/039,016, filed on Mar. 24, 2008.

(51) Int. Cl.
   *H03M 13/00*    (2006.01)

(52) U.S. Cl.
   USPC ........................................................ 714/752

(58) Field of Classification Search
   USPC .......................................... 714/752, E11.032
   See application file for complete search history.

(56) References Cited

U.S. PATENT DOCUMENTS

| | | | |
|---|---|---|---|
| 6,034,996 A | 3/2000 | Herzberg | |
| 6,160,854 A | 12/2000 | Heegard et al. | |
| 6,311,306 B1 * | 10/2001 | White et al. | 714/790 |
| 7,142,612 B2 | 11/2006 | Horowitz et al. | |
| 7,379,505 B2 | 5/2008 | Zaleski, II et al. | |
| 2002/0133781 A1 * | 9/2002 | Mikkola et al. | 714/790 |
| 2003/0023924 A1 * | 1/2003 | Davis et al. | 714/763 |
| 2003/0156603 A1 * | 8/2003 | Rakib et al. | 370/485 |
| 2003/0235149 A1 | 12/2003 | Chan et al. | |
| 2004/0001561 A1 | 1/2004 | Dent et al. | |
| 2004/0014444 A1 | 1/2004 | Ben Rached et al. | |
| 2006/0090114 A1 * | 4/2006 | Duffy et al. | 714/746 |
| 2008/0246639 A1 * | 10/2008 | Sakai et al. | 341/107 |

(Continued)

OTHER PUBLICATIONS

Wicker, Stephen B., *Error Control Systems for Digital Communication and Storage*, 1995, Prentice-Hall pp. 238-239 and 290-332.

(Continued)

*Primary Examiner* — Ajay Bhatia
*Assistant Examiner* — Thien D Nguyen
(74) *Attorney, Agent, or Firm* — Pritzkau Patent Group, LLC

(57) ABSTRACT

A system uses multi-level encoding where each symbol of a plurality of symbols represents more than one bit of information in a user data symbol stream for transfer using a multi-level transmission channel. The user data symbols are represented in a digital bitwise form such that each symbol is presented as a plurality of bits and each bit is subject to a different probability of error. An error correction procedure is applied based on the different error probability that is associated with each bit in the plurality. The channel can be configured to support a mosaic tile structure, each tile containing a channel symbol such that a selected tile has a collective error probability that is different from other tiles. Customized coding can be applied to the tile structure to allocate a selected amount of error correction power to the selected tile based on an overall available correction power.

23 Claims, 17 Drawing Sheets

(56) References Cited

U.S. PATENT DOCUMENTS

| | | | |
|---|---|---|---|
| 2008/0247470 A1* | 10/2008 | Wang et al. | 375/241 |
| 2008/0311920 A1* | 12/2008 | Xu et al. | 455/450 |
| 2009/0013233 A1 | 1/2009 | Radke | |
| 2009/0241006 A1* | 9/2009 | Liikanen et al. | 714/752 |
| 2010/0146363 A1* | 6/2010 | Birru et al. | 714/752 |

OTHER PUBLICATIONS

Ungerboeck, Channel Coding with Multilevel/Phase Signals, Jan. 1982, Ieee Transactions on Information Theory, vol. IT-28, No. 1, pp. 55-67.

* cited by examiner

BITWISE OPERATIONS AND APPARATUS IN A MULTI-LEVEL SYSTEM

RELATED APPLICATION

The present application claims priority from U.S. Provisional Patent Application Ser. No. 61/039,016, filed on Mar. 24, 2008, the contents of which are incorporated herein by reference

BACKGROUND

The present application is generally related to multi-level information systems and, more particularly, to an apparatus and method relating to bitwise operations in a multilevel system.

The prior art is replete with examples of various types of operations that have been performed in single bit systems. Applicants believe that the execution of such operations in the context of multilevel systems have largely been influenced by single bit systems in ways that can be problematic at least with respect to the competing interests of efficiency and error correction, as will be further brought to light below.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a system uses multi-level data encoding where each symbol of a plurality of user data symbols represents more than one bit of information in a user data symbol stream for transfer using a multilevel transmission channel. In one aspect of the disclosure, a method and associated apparatus are described. In relation to the transfer, the user data symbols are represented in a digital bitwise form such that each symbol is presented as a plurality of bits where each bit in the plurality of bits is subject to a different probability of error. An error correction procedure is applied to the plurality of bits, for the bitwise digital form of each user data symbol that is transferred, based on the different error probability that is associated with each bit in the plurality of bits such that an error correction power for at least one bit of the plurality of bits is different than another error correction power that is associated with another one of the plurality of bits.

In another aspect of the disclosure, as part of a system which uses a multilevel transmission channel for transferring user data, a method and associated apparatus are described. The multilevel transmission channel is configured to support a plurality of bitwise data symbols, each of which bitwise data symbols represents more than one bit of information such that each bitwise data symbol is made up of a plurality of bits where each bit in the plurality of bits is subject to a different probability of error. A mosaic data structure is applied to the bitwise data symbols of the multilevel channel based on the different probability of error for each bit, which mosaic data structure is formed of an arrangement of mosaic tiles, and each of which mosaic tiles is configured for receiving a channel symbol such that at least a selected one of the mosaic tiles is characterized by a collective error probability based on the error probability of a selected group of the bits assigned to the selected mosaic tile which is different than another collective error probability that characterizes at least one other one of the mosaic tiles based a different group of the bits assigned to the other mosaic tile. The user data is encoded into the channel symbols in a way which provides an error correction power for correction of one or more errors in at least some of the channel symbols, which errors are caused by the transfer through the multilevel channel. The channel symbols are introduced into the mosaic tiles. Thereafter, the user data is recovered from the channel symbols such that the error correction power of the encoding is applied by a selected amount to at least the selected one of the plurality of bits and by a different amount to at least one other one of the plurality of bits for correcting errors that occur within the selected group of bits in the selected mosaic tile.

In still another aspect of the disclosure, as part of a system which uses multi-level data encoding where each symbol of a plurality of user data symbols represents more than one bit of information in a user data symbol stream for transfer using a multilevel transmission channel, a method and associated apparatus are described. In relation to the transfer, the user data symbols are represented in a digital bitwise form such that each symbol is presented as a plurality of bits where each bit in the plurality of bits forms a portion of one of the data symbols and each bit of each data symbol includes a different bit position. At least one selected bit from a selected bit position of each data symbol is transferred in a bitstream that is subject to a selected encryption/decryption procedure such that a selected amount of encryption of the bitstream is different from another encryption/decryption that is applied to at least one other bit in a different bit position during the transfer.

In yet another aspect of the disclosure, as part of a system which uses multi-level data encoding where each symbol of a plurality of user data symbols represents more than one bit of information in a user data symbol stream for transfer using a multilevel transmission channel, a method and associated apparatus are described. In relation to the transfer, the user data symbols are represented in a digital bitwise form such that each symbol is presented as a plurality of bits where each bit in the plurality of bits forms a portion of one of the data symbols and each bit of each data symbol includes a different bit position. At least one selected bit from a selected bit position of each data symbol is transferred in a bitstream that is subject to a selected compression/decompression procedure such that a selected amount of compression of the bitstream is different from another amount of compression that is applied to at least one other bit in a different bit position during the transfer.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 11b is a diagrammatic illustration of one embodiment for allocating correction power among the two interleaves of FIG. 11a.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
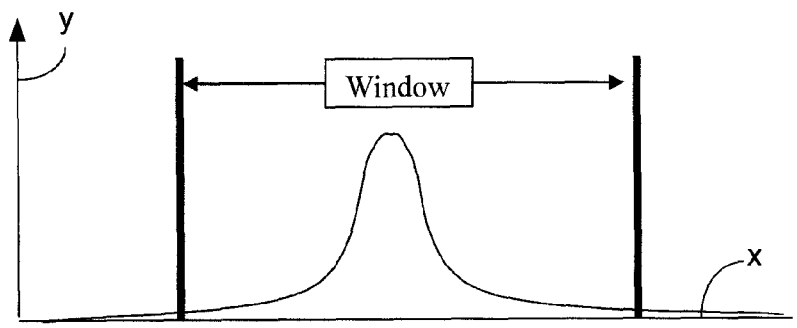
FIG. 1 is a graph illustrating a graph of a variable of interest versus probability in the context of a single bit window showing a probability density function within the window.

A traditional single bit system is generally characterized by the presence or absence of information within a window, generally indicated by the reference number 10, that is illustrated by FIG. 1 showing a probability density function that is a normal distribution of the number of occurrences for each possible value of the variable of interest along the horizontal, x axis of the figure. Thus, the vertical, y axis of the figure corresponds to probability. The horizontal axis can represent any suitable variable including, by way of example, charge in an electron storage device such as flash memory (NROM, NAND, NOR), resistance in a phase change medium storage device (Phase Change Memory (PRAM, nanotubes)), magnetic moment or magnetic spin direction in a magnetic storage device (Probe Storage), the phase angle of information transmitted in a transmission channel (Phase Shift Keying (PSK)), the amplitude or magnitude of information transmitted in a channel (Amplitude Modulation (AM), Pulse Amplitude Modulation (PAM)), the delta frequency transmitted in a channel (Frequency Modulation (FM), Frequency Shift Keying (FSK)), capacitance change (FerroElectric Random Access Memory (FERAM)), or molecular storage) or any combination of the above. It should be appreciated that the concept that is embodied by FIG. 1 applies generally to every know transmission or storage channel either currently known and, most likely, yet to be developed. From this characterization, an information error rate can be statistically determined. In a single bit system, the error can be referred to as the Bit Error Rate (BER). Current examples of single bit systems are most digital telecommunications channels and magnetic recording such as Disk Drives and Tape Drives, and semiconductor storage such as DRAM (Dynamic Random Access), SRAM (Static Random Access) and SLC (Single Level Cell) Flash memory.

A multi-level system is characterized by the use of symbols where each symbol represents more than one bit of information. In such a multi-level system, a symbol stream can be transferred using a multilevel transmission channel where multiple bits of information are needed to represent the symbols transmitted or stored in the system. In the context of this disclosure, a multilevel transmission channel is considered to be any medium or expedient that can be used to transfer the symbols such as, for example, memory cells of any suitable type, electromagnetic signals, optical signals and, more generally, any device that is capable of functioning in a way that implements variables such as described above as characterized by some measurable physical parameter. It should be appreciated that the recognitions that have been brought to light herein are applicable to essentially any form of transmission channel that uses a binary digital representation of symbols that represent more than one bit of information, as will be further discussed below.

Figure 2:
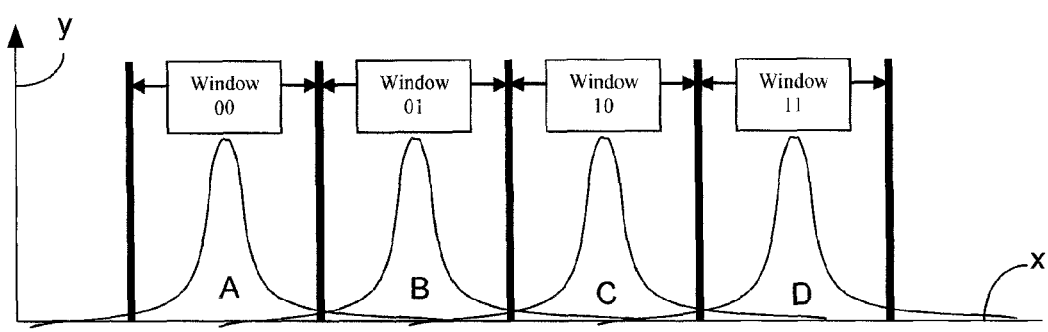
FIG. 2 is a graph of a variable of interest versus probability in the context of a 2 bit multi-level system showing the probability density function for each of the four values along with vertical lines separating regions that are associated with each value.

By way of non-limiting example, a 2 bit multilevel system uses 4 possible values of information represented as a single symbol, as illustrated by FIG. 2 which assigns a two-bit value to each level where each level is illustrated with an associated probability density function, only one of which would generally be employed at a time. As in FIG. 1, the x axis corresponds to a suitable variable of interest while the y axis corresponds to probability. The four available levels are indicated as windows 00, 01, 10 and 11. In one embodiment, this symbol can be represented as the values A, B, C and D where each one of these four values is unique. Using the example of a flash memory cell, such a system can be implemented by the capability to selectively store each one of four different amounts or levels of charge at a single memory location.

Figure 3:
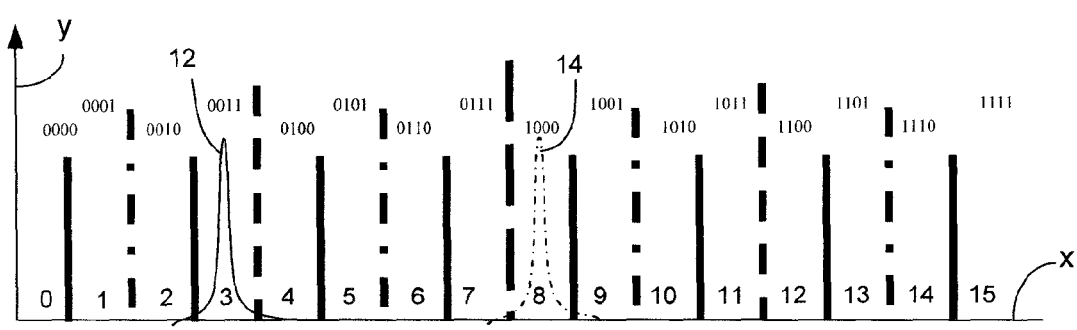
FIG. 3 is a graph of a variable of interest versus probability in the context of a 4 bit multi-level system showing the probability density function for each of the four values separated by vertical lines which demark a region that is associated with each value. Further, two exemplary charge distributions are shown to illustrate variation in per bit error rates.

Graphically, the influence of bit position on error probability can be seen with reference to FIG. 3 which is representative of a 4 bit, 16 level multilevel system. It should be appreciated that the heavy vertical lines in this figure represent borders between neighboring values, which have also been labeled with corresponding base 10 values for purposes of convenience. For one distribution, plotted as a solid line 12 and shown with a value of 3 (0011), the probability of an error in the Most Significant bit (MSB) is relatively small. That is, a read back value would have to be positioned to the right by 5 levels in order to produce an error in the MSB. In contrast, however, for another distribution 14 that is illustrated using a dashed line and with a value of 8 (1000), a significantly higher probability of producing an error in the MSB is demonstrated since the level immediately to the left represents a change in the MSB. In both cases, however, a shift of either distribution to the left or right will produce an error in the LSB. In view of these results, Applicants recognize that the probability of error for each bit within this multi-level symbol is different. Furthermore, the error probability of each bit is a function of the data value within the symbol. That is, the error probability changes based on the position of the bit in a multilevel symbol. As the symbol grows larger in the number of bits it represents, the difference in error probability between the LSB and MSB grows larger and each successive bit within the symbols will exhibit a different probability of error. A system that deals with each bit independently on a bit by bit basis is referred to as a bitwise system in which bitwise operations are performed as opposed to a system that deals with all bits in a group of bits such as a byte or word or symbol as is common in prior art systems. While the foregoing discussion is framed in terms of a read operation in order to facilitate the reader's understanding, it should be appreciated that Applicants recognize that this concern arises as a result of the bitwise conversion to a multilevel symbol as will be further discussed.

Figure 4:
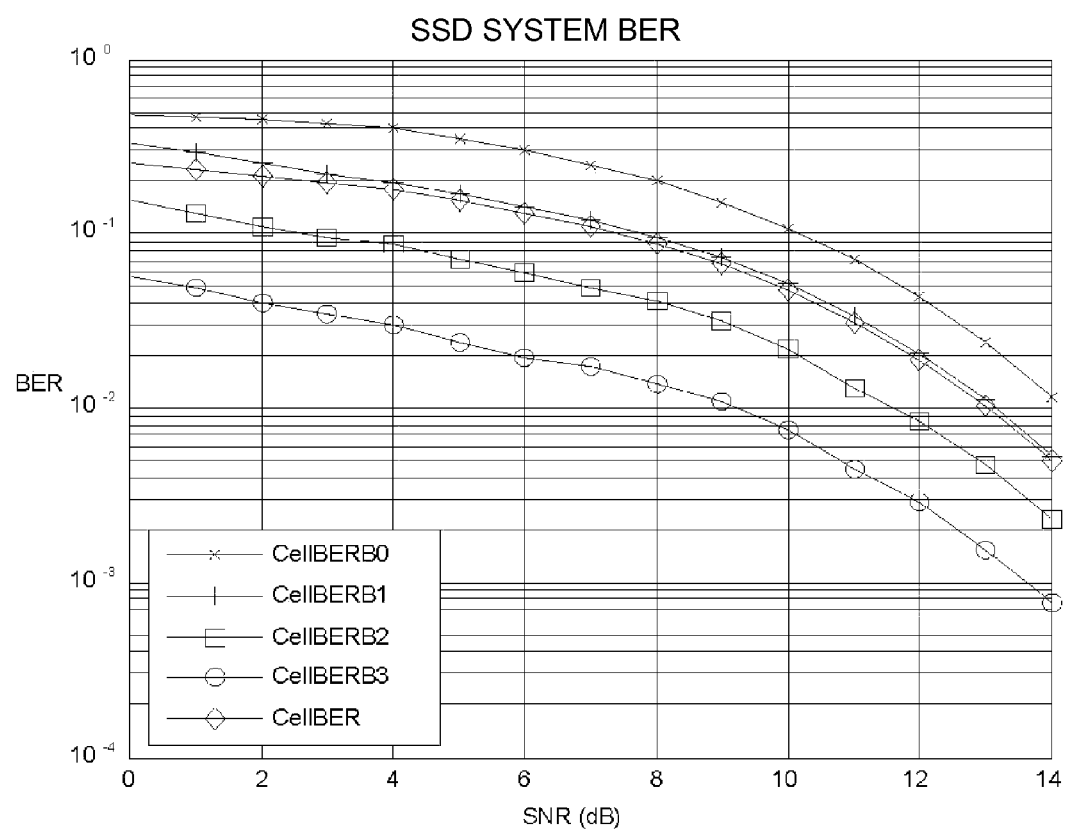
FIG. 4 is a graph of bit error rate versus signal to noise ratio including plots of the error rate for each bit in a 4 bit multi-level system, shown here to illustrate the variation in bit-to-bit error rate.

Turning now to FIG. 4, which is a graph showing bit error rate against SNR, the standard definition of Signal to Noise Ratio (SNR) for this class of transmission or storage channels is the width of the window divided by the standard deviation (sigma) of the signal distribution represented in either power or voltage decibels. A wide distribution with a large sigma has a low SNR. In view of Applicants' recognitions in accordance with the descriptions above, Applicants have separated the error probability for each bit (indicated as CellBERB0-Cell BERB3) and plotted the resultant curves as bit error rates (BER) which are presented as a function of voltage SNR in decibels (dB) in FIG. 4. It can be seen that CELLBERB0 exhibits the highest BER whereas CELLBER1-CELLBER3 exhibit progressively decreasing BER. An average BER curve is shown as CELLBER. It should be noted that the probability of error can be viewed interchangeably based on SNR and BER. That is, a system with a relatively better BER is equivalent to a system with a relatively higher SNR.

It is recognized herein that the bit-to-bit variation in probability of error that has been brought to light above and as demonstrated by FIG. 4, occurs in all multi-level systems. A difference in bit-to-bit error probability reduces the effectiveness of non-symbol bitwise error correcting codes. These codes include, but are not limited to convolutional, turbo and Low Density Parity Code, LDPC, classes of codes that encode a series of bits and expects that the probability of error is the same for all bits. This is in contrast to symbol type coding systems such as Reed Solomon or BCH codes that encode series of symbols rather than bits. In contrast, for a bitwise series coded system, one of the fundamental assumptions of the prior art is that all bits in the series have the same probability of error. In a multi-level system, however, Applicants recognize that this assumption is not valid. For this reason, a multi-level system which includes a bitwise code conversion will fall short of its potential performance when the assumption of equal bit to bit error probability is made.

It is recognized that any time two or more bits of a bitwise code are processed as if they are subject to the same probability of error, the performance of the system will not achieve its potential performance. Applicants observed this degradation empirically, based on system modeling. Treating each bit on the basis of its individual probability of error was likewise observed to resolve the performance degradation which could not be accounted for in some other way. Applicants are unaware of any system in the prior art which treats or handles each bit of such a code according to a customized, different probability of error for each bit.

For any given class of coding system, there is always a tradeoff between the correction capability of the code and the efficiency of the code. The correction capability of all coding systems comes from encoding redundancy bits with the information bits so that errors can be corrected using the redundant information. The more redundant information that is added, the more correction capability the code has. In contrast, however, the more redundant information that is added, the more inefficient the coding system becomes. The tradeoff for a coding system is the balance between the correction capability and the efficiency of the code. The other tradeoff in coding system design is the choice of codes and their implementation complexity. Simple hard threshold detection and mapping functions such as gray code or constellation mapping are very easy to implement, have 100% efficiency, but also have no correction capability. More complex code systems such as convolutional encoding and viterbi decoding are more difficult to implement but do provide correction capabilities—at the cost of loss in efficiency. Even more complex codes such as LDPC have even better correction capabilities with higher coding efficiency but at the cost of extremely large and difficult implementations.

Figure 5:
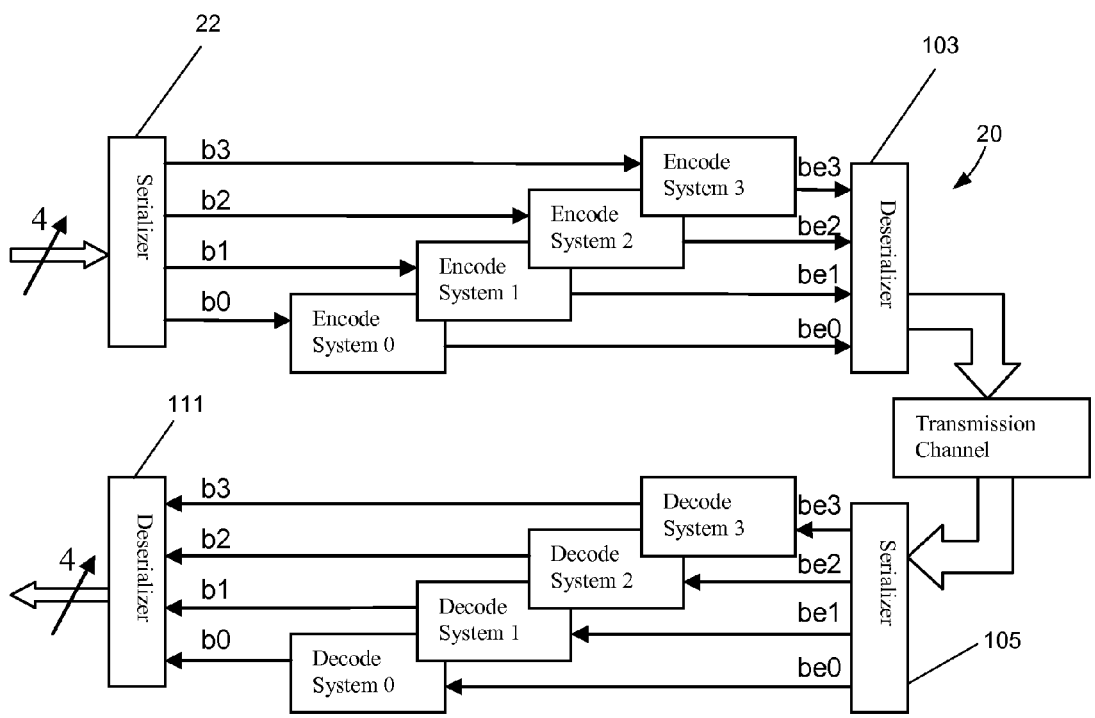
FIG. 5 is a block diagram illustrating one embodiment of a system which implements error correction power that can vary from bit to bit.
Figure 6:
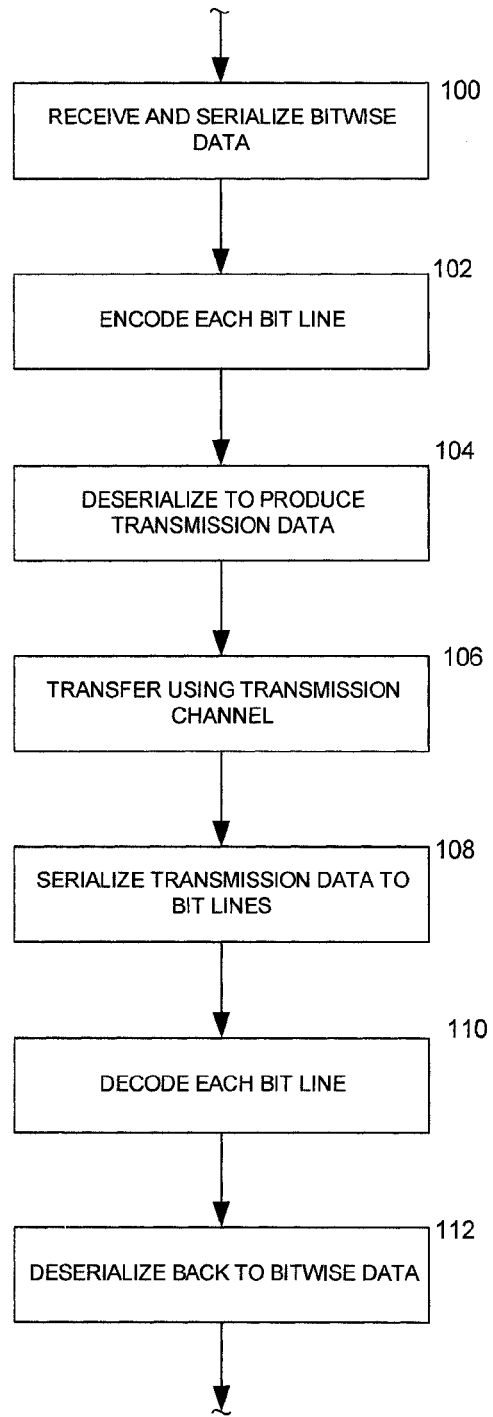
FIG. 6 is a flow diagram which illustrates one embodiment of the operation of the system of FIG. 5.

In one embodiment, generally indicated by the reference number 20 in FIG. 5, and associated method, illustrated by FIG. 6, that is based on the teachings above, the difference in BER between bits of a multi-level system is addressed through coding systems that are customized for the error probability of each bit. One embodiment with respect to the LSB and the next higher bit resides in the use of two different convolutional codes, each with a different given efficiency and correction capability. One code is designed specifically for the SNR/error probability of the LSB and the other being designed specifically for the SNR/error probability of the next higher bit. The overall effect is a more efficient system with higher correction capability. Each bit of the four bit system of FIG. 5 is handled in this manner. FIG. 5 illustrates 4 bits of a bitwise code arriving at a Serializer 22 such that a succession of 4 bit values is received (see step 100 of FIG. 6). The Serializer outputs a dedicated line for each incoming bit. A plurality of encode systems, indicated as Encode Systems 0-3, then separately encode bits arriving on lines b0-b3 such that each line is handled based on a different error probability (see step 102 of FIG. 6). Encoded lines be0 through be3 connect the encode systems to a Deserializer 103 (see step 104 of FIG. 6). As noted above, encoding which imposes more correction capability will generally introduce relatively more parity bits, which may be referred to interchangeably herein as redundancy bits. In this regard, be0 would then be expected to carry a greater amount of data than the remaining lines and each increasing bit in the bit order would require relatively fewer parity bits, with be3 carrying the fewest. In order to compensate for the relative differences in the amount of data carried by lines be0-be3 for an incoming block of input data on lines b0-b3 of a given size, padding bits (zeros, for example) can be added on lines be1-be3 to produce an output block that corresponds to the same length as an output block on be0, responsive to the input block and including the added parity bits. It is noted that this padding functionality can be implemented in the encoding blocks, as part of the Deserializer 103 or as a separate block. Another embodiment that is useful in compensating for the relative differences in the amount of data carried by lines be0-be3 resides in using different coding systems for each line. As an example, consider a system that uses the high correction capability and relatively good efficiency of LDPC on the LSB, be0, and then uses a Turbo code for the next bit, be1, and then a convolutional code for the next bit, be2, and so on. Each coding system is successively more efficient and successively less powerful in its error correction capability. The overall system however can be optimized for the best performance of each coding system with the highest overall efficiency. In addition, the implementation of any one of these systems can also be simplified since the amount of data in each bit line is smaller than the total amount of data. In the case of LDPC, the implementation complexity is relative to the size of the data block on which the code operates. In the above example, the be0 line has one forth the amount of data as the whole data block and therefore can utilize a smaller LDPC implementation.

The data is transferred from the Deserializer 103 to a multi-level transmission channel for transfer and receipt by a Serializer 105 (see step 106 of FIG. 6). From the Serializer 105 that terminates the transmission channel, the data corresponding to each bit is routed onto encoded bit lines be0-be3 and received by respective ones of decode systems 0-3 (see step 108 of FIG. 6). Each decode system is matched to a corresponding one of the encode systems in a manner that is well understood by one having ordinary skill in the art. Decode systems 0-3, at step 110 of FIG. 6, then remove the encoding and place bit data onto bit lines b0-b3. It is noted that padding bits can be removed by the Serializer, by the decode systems or by a separate functional block which has not been shown for purposes of illustrative clarity. Bit lines b0-b3 are connected to a Deserializer 111 which then reproduces the original bitwise data subject to performance constraints at step 112 of FIG. 6.

In the generalized form of the system of FIG. 5, the encode/decode blocks are not limited to convolutional coding. For example, an LDPC code can be applied on the LSB, and a convolutional code on the next higher bit. As a multi-level system grows from 2 or 4 bits to 8 or 16 or more bits, there can be as many different code rates or coding systems, each designed for optimal efficiency and code correction capabilities of the particular bit for which it is implemented. Thus, the type of encoding/decoding on a particular line can be customized irrespective of the type of encoding/decoding that is selected for any other line. In this way, a remarkable and heretofore unseen degree of flexibility is provided, accompanied by the aforementioned enhanced performance.

In view of the foregoing, an optimally designed coding system for the SNR of each bit within a system is produced. It should be appreciated that implementation complexity can be reduced by using relatively more complex encoding systems for the lowest SNR bits rather than for all the bits as would be in a traditional design where, for instance, an LDPC coding system might be implemented for all bits as if they were each subject to the same probability of error. For example, in one embodiment, if an LDPC implementation was needed only for the LSB in the above system, that LDPC section could be made 1/4 the size of an implementation which would subject all 4 bits to LDPC coding. In this regard, the term "coding" refers collectively to the encoding and associated decoding process.

Figure 7:
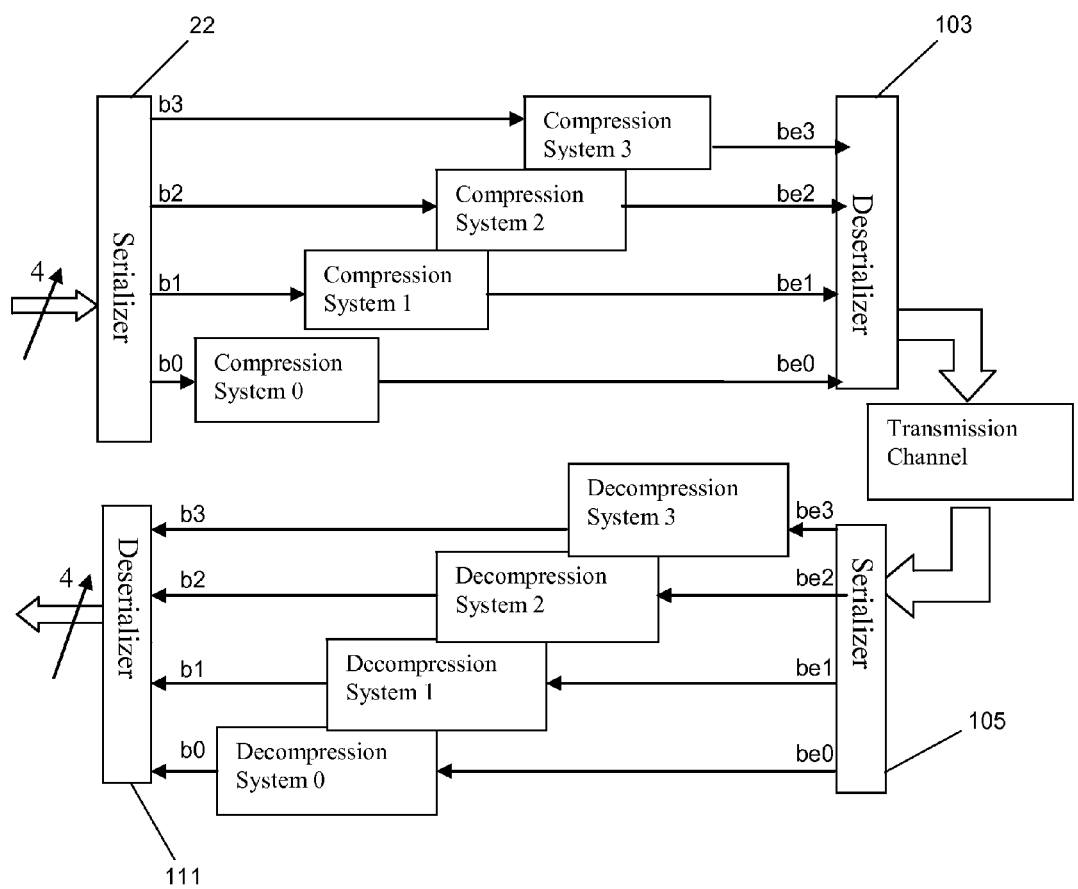
FIG. 7 is a block diagram illustrating one embodiment of a system which implements data compression having a data compression power that can vary from bit to bit.

At this juncture, it is appropriate to discuss a number of other embodiments that are available based, at least in part, on certain teachings that have been brought to light above. Accordingly, attention is now directed to FIG. 7 in conjunction with FIG. 5. FIG. 7 illustrates a system which is identical to the system of FIG. 5, however, encode/decode systems 0-3 have been replaced by compression/decompression systems 0-3.

Figure 8:
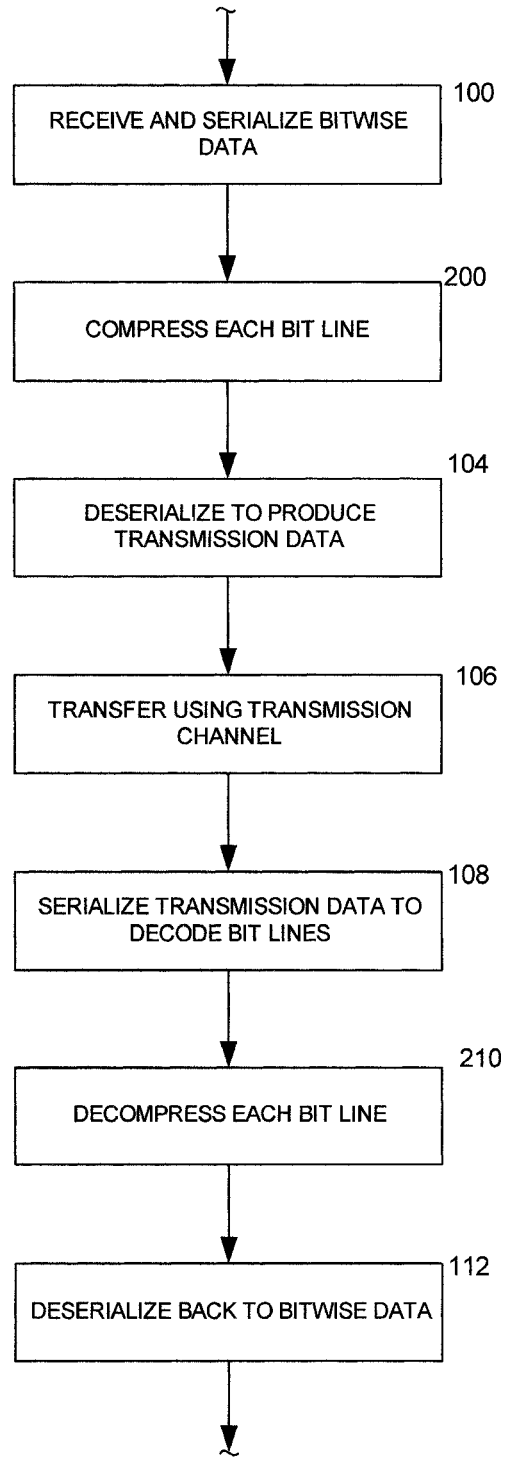
FIG. 8 is a flow diagram which illustrates one embodiment of the operation of the system of FIG. 7.

Comparison of FIGS. 6 and 8 reveals that operations are performed in a similar manner except that encode step 102 of FIG. 6 has been replaced with compression step 200 of FIG. 8 and decode step 110 of FIG. 6 has been replaced with decompression step 210 of FIG. 8. In particular, each bit line includes a matched pair of compression and decompression systems such that each one of bit lines be0-3 is subject to compression that is essentially independent of the compression that is in use on the other bit lines.

What is embraced by FIGS. 7 and 8 resides in a reconfiguration of data for compression. In the prior art, data values in the form of bytes or words or symbols of variable numbers of bits are processed through a data compression algorithm. The present embodiment sweeps aside this constraint and transforms the incoming information into a series of individual bit streams corresponding to the number of bits represented in the data. For example, a byte of data would have 8 bit streams of data, a word would have 16 bit streams and so on. Each bit stream is then individually compressed. The compression algorithm for one stream may be different than that of another stream. Multiple compression algorithms allow each data bit stream to be compressed based on the characteristics of the bit within the original data.

As an example of how different compressions may be applied, consider data that is unsigned amplitude information, commonly referred to as magnitude information. The volume of the number of shares of stock sold in the stock market is an example of such data. For this type of data, it is common that the maximum binary value occurs much less frequently than small values and therefore, the MSB of the binary representation of this data is zero more often than it is a one. The MSB could therefore be compressed through any number of different algorithms more than the LSB of the same data. The LSB may have different characteristics which allow it to be compressed more efficiently if an algorithm other than the one used on the MSB were used. It is recognized that each bit in turn can be optimized independently for the characteristics of that particular bit.

Another embodiment will now be described with initial reference to FIG. 9. It is appropriate to compare this figure with FIGS. 5 and 7. Accordingly, the system of FIG. 9 is essentially identical to the systems of FIGS. 5 and 7, however, the encode/decode systems 0-3 of FIG. 5 have been replaced by encryption/decryption systems 0-3.

Figure 10:
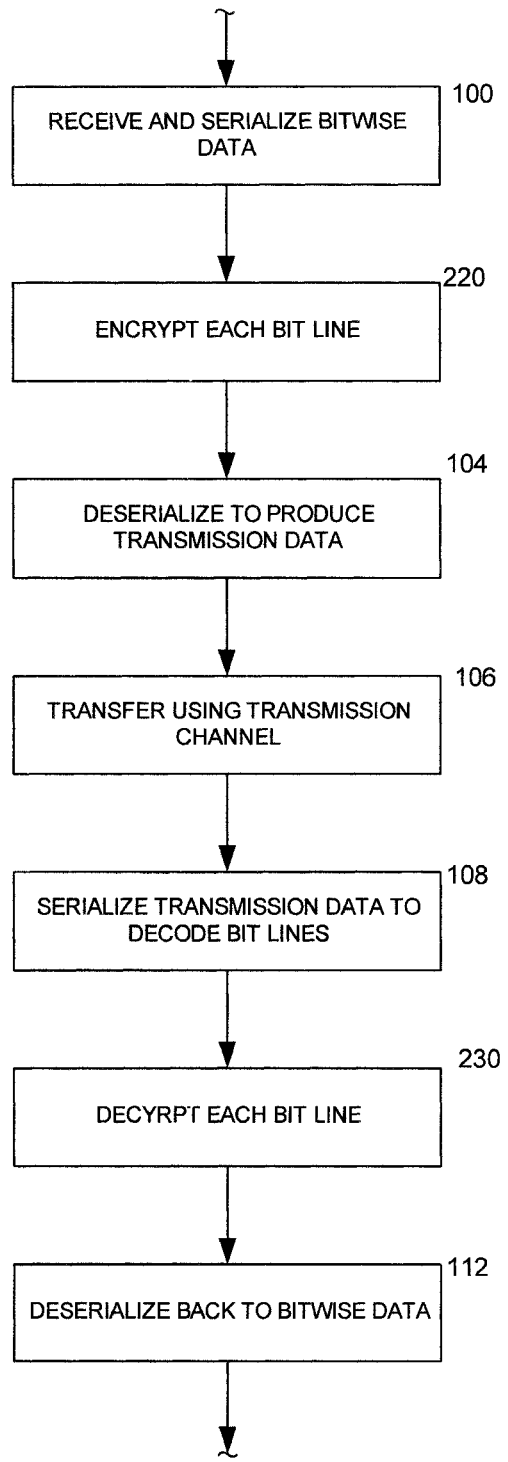
FIG. 10 is a flow diagram which illustrates one embodiment of the operation of the system of FIG. 9.

Comparison of FIGS. 6 and 10 reveals that operations are formed in a similar manner except that encode step 102 of FIG. 6 has been replaced with encryption step 220 of FIG. 8 and decode step 110 of FIG. 6 has been replaced with decryption step 230 of FIG. 10. In particular, each bit line includes a matched pair of encryption and decryption systems such that each one of bit lines be0-3 is subject to encryption that is essentially independent of the encryption that is in use on the other bit lines.

Figure 9:
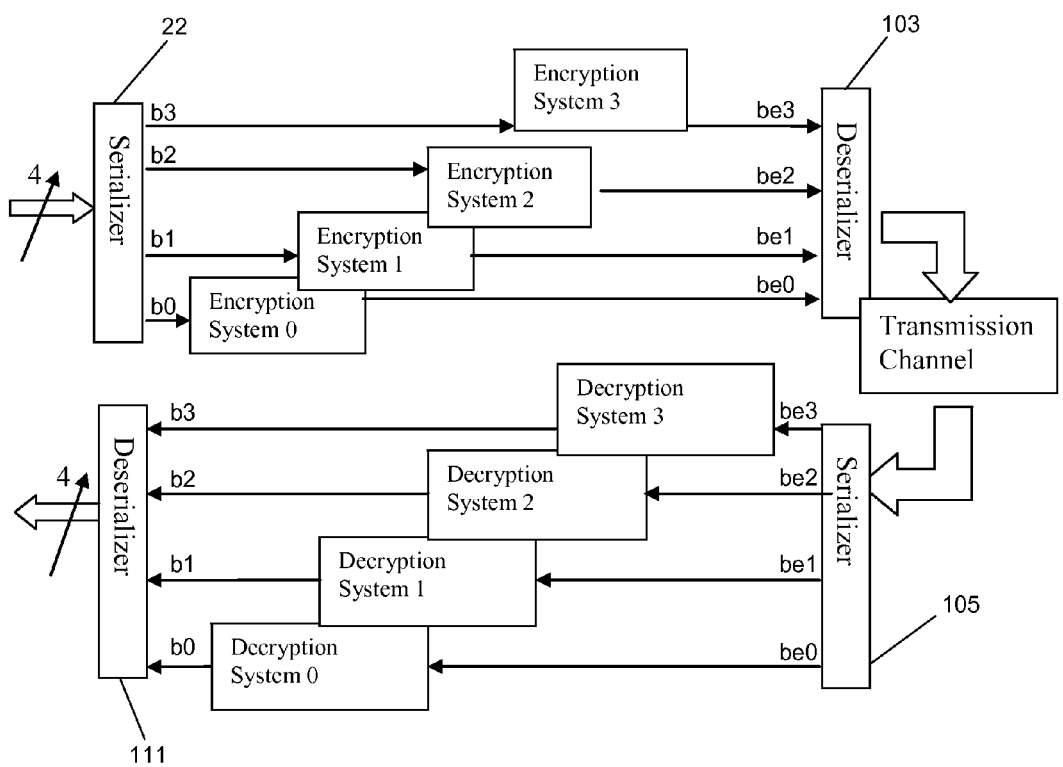
FIG. 9 is a block diagram illustrating one embodiment of a system which implements data encryption having an encryption power that can vary from bit to bit.

What is embraced by FIGS. 9 and 10 resides in a reconfiguration of data for encryption purposes. In the prior art, data values in the form of bytes, words or symbols of variable numbers of bits are processed through a data encryption algorithm with each of these data values being handled as a unit. In FIG. 9, the incoming information in the form of nibbles (4 bits) is first transformed into a series of individual bit streams corresponding to the number of bits represented in the data. For example, a byte of data would correspond to 8 bit streams of data, a word would correspond to and generate 16 bit streams and so on. Each bit stream is then individually encrypted. The encryption algorithm for one stream may be different than that of another stream. Multiple encryption algorithms allow each data bit stream to be encrypted independently. By way of example, an encryption key may be different from one bit line to another and/or the encryption algorithm and/or the length of the encryption key may be different. For instance, each of bit lines be0-be3 may be subjected to a different encryption key and/or a different encryption algorithm so as to provide different amounts of encryption power.

As an example of how different encryptions may be applied, consider a Pretty Good Privacy (PGP) secure transaction system commonly in use today. In this prior art system, an encryption key is generated that is shared between two parties and the message is encrypted in a bytewise manner. In general, the strength of the encryption in such a prior art system is determined by the number of bits in the encryption key. According to the present disclosure, however, by encrypting each bit individually with a key of the same length as in the prior art bytewise system, the effective encryption key length is increased. This characteristic can be used in at least two ways: One provides for making a stronger encryption/decryption system by presenting more encryption systems that would necessarily be subject to decipher. Another provides for maintaining the same or equivalent level of security of encryption/decryption with a key length that is shorter. As a non-limiting example of the latter, consider a large system that operates on 64 bits at a time. A system with one key length that operates on all 64 bits at once can be duplicated with 64 systems, one for each bit, with a shorter key. Since the key generation is the longest, most complicated, procedure involved in the process of encrypting/decrypting, it is of benefit to be able to generate shorter keys with the same security level.

In view of FIGS. 5-10, it should be appreciated that other types of operations may be well-suited for use in introducing and then removing specialized coding to and from each one of the bit lines, respectively, in order to accomplish some particular objective in view of the specific non-limiting examples above which include error detection related encoding, data compression and security encryption.

Turning now to additional details with respect to the application of Error Correcting Codes in storage systems based on multi-level storage media. Flash Memory remains as the exemplary medium, but other technologies capable of storing more than one bit per storage cell are considered as equally applicable. Performance improvement is disclosed in the context of techniques that are directed to use in two different environments: (1) the first environment resides in the use of prior art 2-bit per cell memory that uses standard NAND flash circuit topologies and interfaces, and (2) the second environment resides in the use of greater than 2-bit per cell memory in memory devices circuitry and interfaces customized for use with the system such as is described above. Both techniques exploit the recognition that has been brought to light above with respect to multi-level systems (including Flash memory) wherein each cell exhibits a probability of error that is higher for bits of lesser significance than for bits of higher significance.

Error correction in conventional Flash Memory including two bit per cell embodiments has typically been deployed through implementations of bit-correcting codes known as BCH codes. These codes are effective in correcting randomly-occurring single-bit errors. In contrast, Reed-Solomon Codes can correct multiple-bit symbols, with each symbol defined as containing a specific number of bits. For example, a byte-correcting Reed-Solomon Code can be constructed that uses 8-bit symbols, and which corrects any subset of the bits contained in a single 8-bit symbol as one unit. Although the disclosed techniques may be implemented using either BCH or Reed-Solomon Codes, the discussion refers to Reed Solomon coding since Reed-Solomon codes provide the ability to correct multiple bits per symbol. By way of example, for a given block of data, a Reed Solomon Code can correct a specific number of symbols, irrespective of the number of bit errors that are contained by any given symbol. That is, for a given symbol, all of its bits could be in error and the symbol would be corrected so long as the total number of symbols in error does not exceed the correction capability of the code.

As alluded to immediately above, since Reed-Solomon and BCH codes are block codes, applying them requires that data be encoded and decoded in block units. In the prior art, Reed-Solomon or BCH ECC coding are configured to compute ECC parity with equal weight given to all symbols comprising a block of data. A related concept, called "interleaving", is a partitioning technique that divides a data block into two or more parts, each of which is separately subjected to ECC encoding. The term "interleaving" usually applies to a technique that groups alternating symbols in a sequence into separate groups—other partitioning techniques may be applied with equal validity, but simplicity of implementation makes the interleaving technique useful. Normally, the prior art application of ECC or BCH encoding uses interleaves which are equal, or very nearly so, in length to one another. In practical terms, interleaving a block is the same as slicing it into multiple portions, with each portion then treated as an independent unit for ECC encoding and decoding. Unlike the prior art, the interleaves used herein may be of variable length, and still be categorized as interleaves. This variability may be the result of different numbers of parity symbols being appended from one interleave to the next (i.e., the T value of the correction code varies based on bit position error considerations in a multilevel system), however, such variability may arise in other ways, yet may be addressed in a manner that is consistent with the teachings herein.

It should be appreciated that prior art solutions of which Applicants are aware give equal weight to each interleave with respect to error correction power. This means that for each of I interleaves numbered 0, 1, 2, ..., I-1, each with n'-k' message symbols, each interleave is encoded with k' parity symbols where n' is the total number of symbols, k' is the total number of parity symbols and n'-k' is total number of user data symbols which may be termed as message symbols.

In one aspect of this disclosure, more efficient use can be made of available spare memory symbols in a given memory to balance the correction required by the differing probabilities of bit-level error that is associated with stored data based on the significance of bits in each of the stored symbols. Two variations are described below. The first variation applies to the case in which 2-bit memory symbols are being stored, and the second variation is a more general case of 3-bits per symbol or more. In both variations, the LSB in each symbol has a higher probability of error than its accompanying MSB or bits with significance greater than the LSB but less than the MSB. In the case of wider symbols, in which TCM encoding is also applied such that parity bits are added, the TCM decoder itself adds its own properties to the error signatures that can be corrected by the Reed-Solomon codes. That is, TCM generally adds decoding errors that show up as groups of bits; hence, correction is directed not only to error probabilities varying as a function of bit significance within memory symbols, but also to the tendency of errors to appear in bursts, which may be termed as "burstiness" in the vicinity of decoding errors made by the TCM decoder.

(1) 2-Level NAND Flash With Standard Circuit Topology and Standard Interface

The technique that is advantageously applied represents a marked improvement in the use of FCC parity allocated to storage media in devices that store 2 or more bits per cell, provided certain requirements can be met by the memory itself. In accordance with this technique, the available FCC parity is re-partitioned so that relatively more parity bits are used to correct errors on data most likely to have errors; and that fewer parity bits are allocated to error correction for data bits less likely to have errors. In this way, better memory performance can be achieved with a fixed budget of available parity bits. In standard flash memory, the available parity stored is a fixed amount appended to each page. Accordingly, the result for standard flash with such a fixed parity bit budget is better utilization of the parity bits at hand.

As has been brought to light above, this re-allocation of correction capability is based on the recognition that in multi-level storage, the LSB of a data symbol (i.e., a multi-bit data value that can be stored in a memory cell) is more likely to be in error than the MSB of the same data symbol. In the prior art, there does not appear to be any recognition of this fact as evidenced by FCC encode/decode processes in which all the LSBs in a data block are associated with the same number of parity symbols as the MSBs. It should be appreciated that the present discussion refers to the LSB as a value that is subject to a greater probability of error as a result of symbol to bit stream conversion such as is associated with storing and retrieving a data symbol to and from a memory cell of a multi-level system. That is, by way of example, the LSB of interest would be bit zero of a four bit value when a memory cell is capable of storing 16 values. Such four bit and like values will be referred to herein as "data symbols" that are not to be confused with FCC encoding symbols such as, for example, Reed Solomon symbols.

The present disclosure addresses this situation first of all by using bitstream FCC encoding (see, for example, FIGS. 5 and 6), which can encode the LSB so as to create a set of parity symbols determined solely on the LSBs of a data block and thereby proportionally customize the correction power that is directed to the LSB. As demonstrated by FIG. 6, a customized correction power can be applied to each bit in order of significance. Accordingly, it should be recognized that the T value of the correction code varies per bit. An encoder, constructed in light of these teachings, can be configured to truncate parity fields for more significant bits relative to bits of lesser significance. In this way, the configuration of the encoder can match the available parity resources for a given flash memory in a customized way, but proportionally allocate more parity symbols to the LSBs than to the MSBs. A cooperating decoder performs the inverse function of the decoder, but is able to correct more errors occurring with respect to the bits of lesser significance relative to bits of greater significance.

(2) n-level NAND Flash With Custom Circuit Topology and Custom Interface using TCM As recognized above, a multi-level storage system has bit error probabilities that vary according to the significance of the bits in each data symbol. TCM coding can be used to deal with this fact by applying more robust coding to the LSB (or bits of greater significance than the LSB but of lesser significance than the MSB) of each data symbol via a convolutional code, and more general constellation mapping may be applied to the remaining bits of each data symbol. The effect of this encoding is to provide for correction of the predominance of LSB errors that occur on readback as well as the lesser frequency of more significant bit errors that also occur. However, the decoding process misses some errors that the next level of FCC correction, in this case a Reed-Solomon code, is targeted to subsequently correct. Although the action of the TCM decoder is to reduce the natural error frequency in the readback sequence by orders of magnitude, errors can still appear at the output of the TCM decoder. These TCM decoder errors have two salient characteristics:

(1) Error probabilities are still distributed bit-by-bit relative to the bit significance of decoded data symbols. The lower the significance of the bits of each decoded data symbol, the greater the probability it will be subject to error. Nevertheless, decoding errors can occur on any or all bits of each symbol returned by the decoder.

(2) Although many decoding errors occur on individual bits of decoded data symbols in an isolated fashion, there is nevertheless a tendency for decoding errors to appear in groups, and in instances where these groups of bits fail, the subsequent FCC correction design should be able to correct them to a great extent.

Prior art implementations of Reed-Solomon error correction are able to correct errors with the above properties given sufficient overhead. The present disclosure facilitates improvement relative to prior art methods, in one sense, by making possible greatly reduced overhead to achieve the same result, with the benefit of enhanced efficiency. Greatly reduced overhead with the benefit of enhanced efficiency is provided by recognizing that error probability varies bit by bit and relying on this property to encode at least the LSBs independent of other bits; and to encode non-LSBs in a methodical way. Accordingly, the predominance of LSB errors as well as correlated non-LSB errors are corrected with more efficiency than the efficiency that is exhibited by prior art approaches.

Aspects of the present disclosure relative to the prior art (1) For 2-level NAND Flash (exemplary) with Standard Circuit Topology and Standard Interface. More efficient utilization of spare bytes available for use as FCC parity is provided with the result that on average, more data errors can be corrected per block than in prior art implementations. This, in turn, makes possible more reliable and/or longer-life memory than otherwise possible. Viewed in one sense, the memory can degrade to a greater degree over its life and yet remain useful for a relatively longer period of time, since the errors associated with the degradation will be correctable up to some number of errors that exceeds an overall correction power of the correction scheme that is employed.

(2) For NAND memory (exemplary) with 2-bits or more per cell in a custom memory configured with a custom interface, it is possible for a system to use significantly fewer FCC parity symbols per block than would be possible by prior art approaches to FCC encoding to maintain a given degree of correction capability. Of course, this improvement can manifest itself in higher density, more reliable memory relative to prior art approaches to FCC implementations.

Figure 11A:
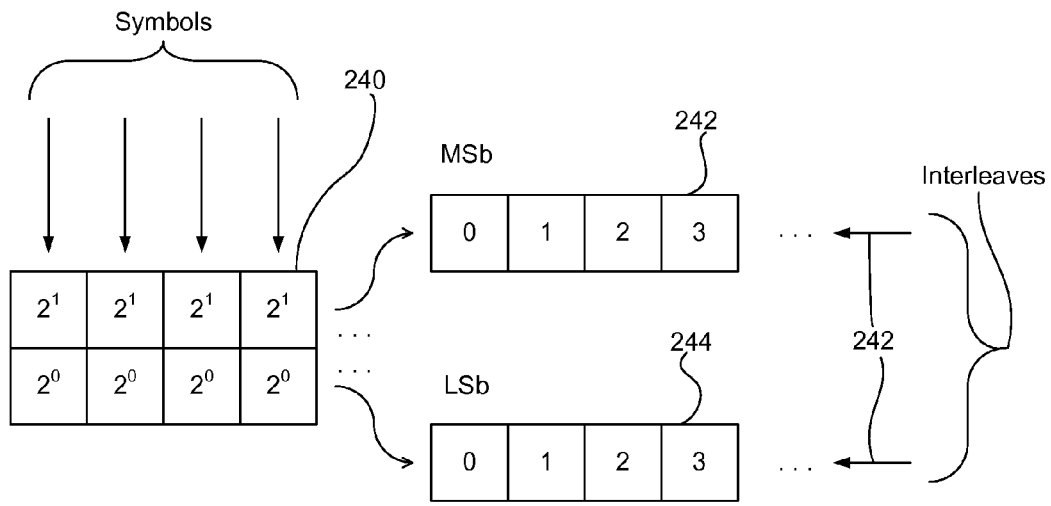
FIG. 11a is a diagrammatic illustration of one embodiment for interleaving and deinterleaving a 2 bit symbol value.
Figure 11B:
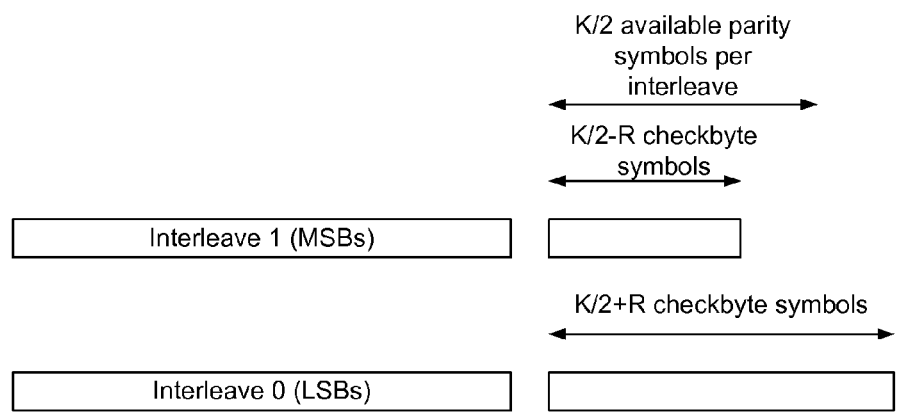

FIGS. 11a and 11b illustrate one manner in which 2-bit symbols might be managed in one embodiment.

In FIG. 11a, the conversion of a series of 2-bit memory symbols 240 to unencoded interleaves 240 and 242 is diagrammatically represented. The symbols can represent values stored in 2 bit per cell memory locations. What is illustrated resides in constructing two separate interleaves by splitting each 2-bit symbol into its MSB and LSB. The MSB makes up or is added to the upper one of the interleaves in the figure and the LSB makes up or is added to the other, lower interleave in a sequential manner. The process is reversible as indicated by arrows 246. The two interleaves constructed this way can be Reed-Solomon encoded according to the approach shown in FIG. 11b.

FIG. 11b is a diagrammatic illustration showing one embodiment in which a budgeted amount of overhead available for Reed-Solomon parity can be allocated to the encoding of the interleaves constructed in FIG. 11a. First of all, it is presumed that the interleaves constructed in FIG. 11a have been converted from a sequence of bits into a sequence of Reed-Solomon Symbols that can be directly encoded by a Reed-Solomon Checkbyte Calculation process acting on each interleave. FCC encoding can then be performed on the interleaves. The procedure for doing so may be consistent with conventional methods (familiar to Reed-Solomon practitioners) or the procedure may involve separate treatment of the interleaves. In either case, the result is a Reed-Solomon encoding which results in a series of residue symbols (checkbytes) accompanying each interleave. FIG. 11b illustrates that a set of K overhead symbols can be available for the overall set of residue symbols. In the present example, however, K/2+R of this total can be allocated to Interleave 0 (containing the LSBs which are most likely to be in error), and K/2−R can be allocated to Interleave 1 (containing the MSBs) which are less likely to be in error. R, in this example, can be any value less than one-half the value of K. Accordingly, customized error correction has been applied on the basis of bit significance. Additional examples will be provided below which extend the concepts that have been brought to light thus far to more complex situations. It can be seen that a greater number of parity symbols have been dedicated to the LSB of Interleave 0.

It should be appreciated that a multi-layered coded system includes at least two encode and two decode blocks. A multi-level channel or medium allows the transfer or storage of information in a digital form represented by more than 1 bit. A 1 bit system is generally referred to as a single level system. Two bits requires at least 4 levels to fully represent digitally, three bits requires 8 levels, 4 bits 16 levels and so on in a 2^n fashion. As noted above, the values that are actually stored in the multi-level memory cells are referred to herein as data symbols.

In a system that employs Reed Solomon (RS) error correction as an outer layer of the coding systems and Trellis Coded Modulation (TCM) as an inner layer of the coding system in conjunction with a multi-level channel, it is common that the symbol sizes between the different systems are of different sizes. In a typical system, information (i.e., actual user data) is represented as an 8 bit byte. A Reed Solomon encoding system commonly has symbol sizes other than 8 bits. For example, disk drive RS systems commonly use 10 bit symbols. In Trellis Coded Modulation, on the other hand, coding can vary from 3 bit to 6 bit symbol sizes and multilevel channels may include any number of levels to represent 2 or more bits. The nature of TCM causes errors to tend to occur in bursts. This is a characteristic of the convolution/Viterbi portion of the TCM coding system. It should be appreciated that bursts of errors are best handled in a Reed Solomon system when multiple errors occur in only one RS symbol, as opposed to distributing these errors over multiple symbols. As will be seen, Applicants have recognized that the characteristics of these two different coding systems lend themselves to arranging or mapping the bits and symbols of the different systems in memory cells in a fashion that best utilizes the strengths of each system.

In a multilevel channel, the least significant bit has the highest probability of error, as described above. For this reason and in one exemplary embodiment, a convolutional code along with a maximum likelihood detector can used on the LSB alone while the most significant bits can be coded through constellation mapping. TCM coding, however, then generates parity bits such that there are more least significant bits than most significant bits. It should be appreciated that when errors occur in the LSBs, the errors can affect the constellation selection for the MSB's, which results in even more errors. Furthermore, should a burst of errors occur out of the TCM, it is more likely to influence the least significant bit. Thus, the correction system can benefit by imposing the Reed Solomon symbols in a way which operates to effectively spread the correction capability of the RS system over a larger burst of errors.

Figure 12:
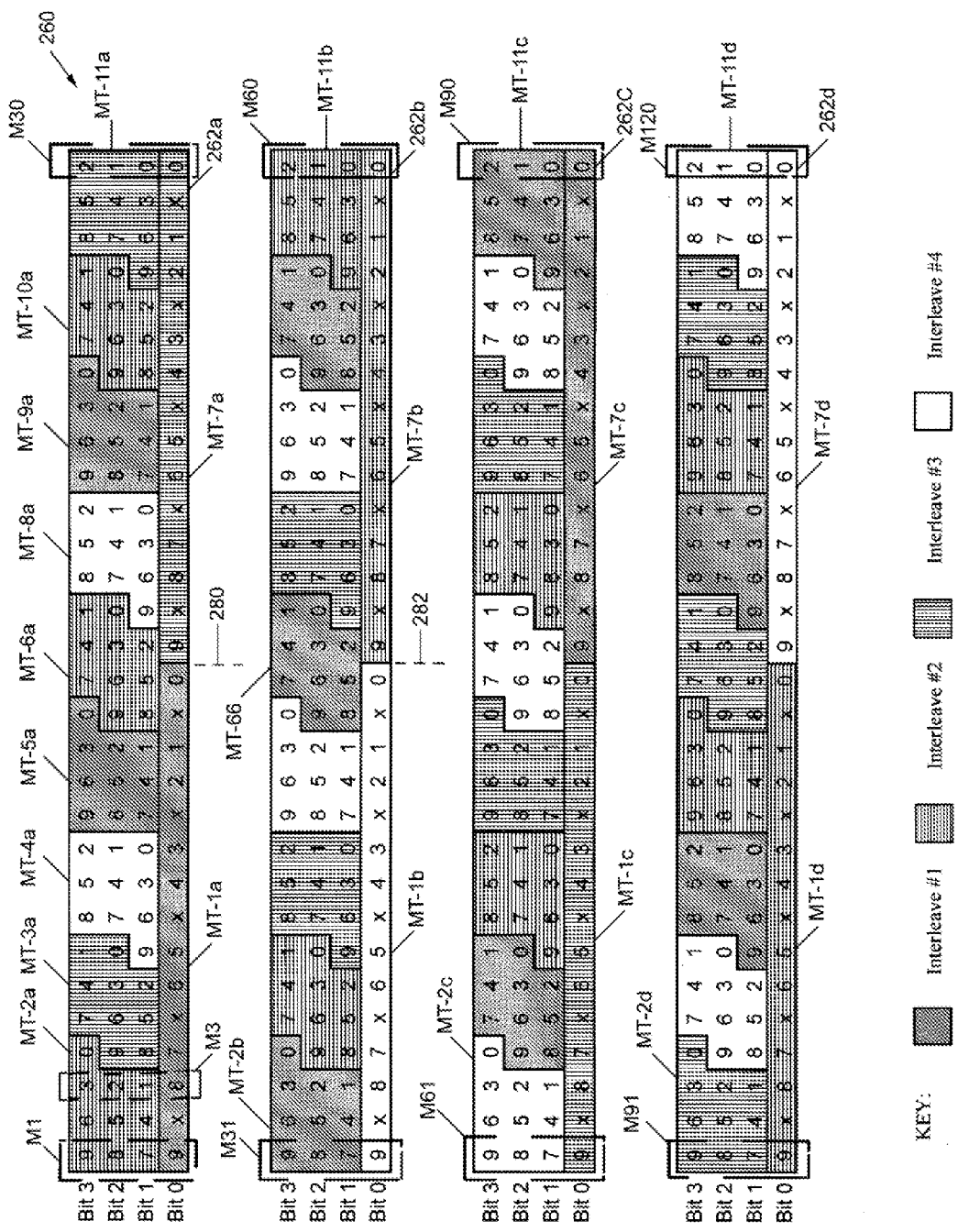
FIG. 12 is a diagrammatic illustration of one embodiment of a data structure that can be imposed on an arrangement of 120 memory cells, each of which memory cells can store a 4 bit value or symbol.

Turning to FIG. 12, a data structure or mosaic is generally indicated by the reference number 100 and diagrammatically illustrated. Data structure 260 may be imposed on an arrangement of memory cells M1-M120 that are shown in four rows 262a-262d of 30 cells each for illustrative purposes and a number of which are designated within dashed rectangles. These memory cells can be addressable in a sequential manner, although this is not a requirement. In the present example, each memory cell stores a four bit value as a data symbol, for example, as some amount of charge in a flash memory cell. Corresponding bit values are labeled as Bit 0 through Bit 3 adjacent to each row in the figure. Further, a distribution of four interleaves of data is illustrated throughout the map with each interleave containing Reed Solomon symbols that are produced from a respective one of four blocks of data. It is noted that a key 270 is provided which shows the various regions that form the interleaves. The symbol that is received by each tile may be referred to as a channel symbol. The first interleave is illustrated using a diagonal cross hatch that is applied to those bit positions containing the first interleave. The second interleave is illustrated using a horizontal cross hatch that is applied to those bit positions containing the second interleave. The third interleave is illustrated using a vertical cross hatch that is applied to those bit positions containing the third interleave. The fourth interleave is illustrated using no cross hatch applied to the bit positions that contain this data. Data structure 260 further imposes a mosaic on the memory cells that is made up of a pattern of mosaic tiles, each of which can contain one ten bit Reed Solomon symbol at a given time. In the present example, the first 30 memory cells are shown, with the bits of these memory cells having been assigned Mosaic Tile (MT) numbers MT-$1_a$ through MT-$11_a$. At least ten Reed Solomon bit locations are encompassed by each mosaic tile, with the individual Reed Solomon bit numbers being designated in each mosaic tile as 0-9. For MT-$2_a$ through MT-$6_a$ and MT-$8_a$ through MT-$11_a$, the Reed Solomon bit numbers are arranged in what is termed as a serpentine fashion which can range across bits 1-3 of the memory cells, as illustrated, before proceeding to use bits of an adjacent memory cell. For example, in MT-$2_a$, bits 1-3 of memory cell 3 contain Reed Solomon bits 1-3, respectively. Bit 3 of memory cell 4 contains Reed Solomon bit 0. Bits 1-3 of memory cell 2 contain Reed Solomon bits 4-6, respectively, and Bits 1-3 of memory cell 1 contain Reed Solomon bits 7-9. The Mosaic Tiles which contain Reed Solomon bits arranged in a serpentine pattern may be referred to as serpentine tiles. In contrast, MT-$1_a$ and MT-$7_a$ may be referred to as "flat tiles", since these two MTs contain all bit zeros for memory cells 1-30 within these two Reed Solomon symbols. Insofar as these flat tiles contain the bitstream that is associated with the least significant bit selected as a group, it should be appreciated that a collective error probability for these flat mosaic tiles represents a maximum error probability with respect to all of the mosaic tiles. Selection of a different group of bits for assignment to another tile results in a lesser collective error probability since the different group of bits includes bits that are associated with lesser probability of error. It should be noted that the subject flat tiles contain 15 bit positions, as opposed to the 10 bit positions that are contained by the serpentine tiles. The five extra bit positions are identified using an "x" which is distributed throughout the ten bit positions of the Reed Solomon symbol stored therein. The x positions are parity bits that are determined by the TCM encoding which is applied in this embodiment to bit zero of the memory cells in order to compensate for the increased error probability that is associated with bit zero of the memory cells.

Figure 13:
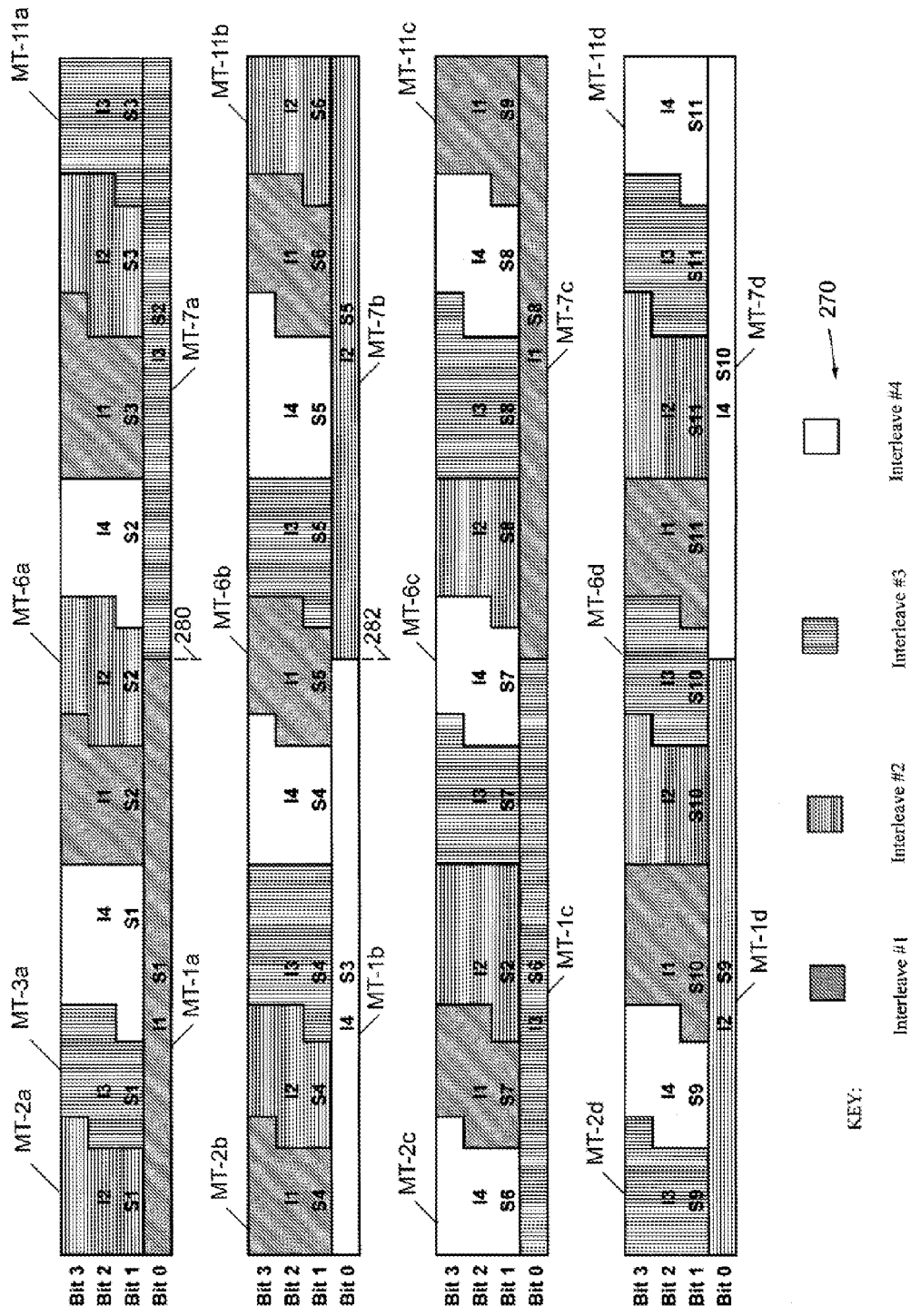
FIG. 13 is another diagrammatic illustration of the data structure of FIG. 12 shown here to illustrate other aspects of the interleaves and symbols contained therein.

Still referring to FIG. 12, the pattern of MT-$1_a$ through MT-$11_a$ repeats for each successive group of 11 MTs illustrated in the figure. In this regard, subscripts a-d have been applied to designate the row in which a particular MT appears, although such designations have been applied to a limited number of MTs for purposes of illustrative clarity. It is important to understand, however, that the contents of the MTs rotate among the interleaves in a predetermined way. FIG. 13 illustrates the mosaic of FIG. 12 with each MT having a designation of the Interleave and RS symbol associated therewith. Each MT is labeled as IxSy where x and y represent the interleave number and the number of the Reed Solomon symbol as part of that interleave.

In the present embodiment, MT-$1_a$ contains the first RS symbol of interleave 1 (I1S1) to which TCM encoding has been applied. MT-$2_a$ contains the first RS symbol of interleave 2 (I2S1); MT-$3_a$ contains the first RS symbol of interleave 3 (I3S1); and MT-$4_a$ contains the first RS symbol of interleave 4 (I4S1). MT-$5_a$ then contains the second RS symbol of interleave 1 (I1S2) and MT-$6_a$ contains the second RS symbol of interleave 2 (I2S2). It should be appreciated that MT-$6_a$ contains RS bits 0-4 which are actually ahead of a border 280 at what may be referred to as a leading edge of MT-$1_a$. For this reason, MT-$7_a$ contains the second RS symbol of the third interleave (I3S2), including TCM encoding. MT-$8_a$ then contains the second RS symbol of the fourth interleave (I4S2); MT-$9_a$ contains the third RS symbol of the first interleave (I1S3); MT-$10_a$ contains the third RS symbol of the second interleave (I2S3); and MT-$11_a$ contains the third RS symbol of the third interleave (I3S3). Rotation among the interleaves then continues by MT-$1_b$ containing the third RS symbol of the fourth interleave (I4S3) with the contents of subsequent MTs being apparent in view of the figure. At a junction 282, it can be seen in FIG. 12 that RS bit positions 0-4 of MT-$6_b$ are ahead of what may be referred to as a leading edge 282 of MT-$1_b$. For this reason, MT-$7_b$ contains the fifth RS symbol of the second interleave (I2S5). All memory cells shown are subjected to the described mapping. It should be appreciated that the entirety of the mapping pattern has been illustrated and that the mosaic of the figure can now repeat. It can be seen that for each interleave, eleven RS symbols are mapped out in the memory arrangement. Moreover, symbols from the various interleaves are distributed among the mosaic tiles in a way which balances error probabilities among the interleaves since each interleave appears twice in one of the flat tiles. By way of example, a Reed Solomon symbol size of 10 bits was selected with a 4 bit data symbol size. It is to be understood that this selection is not intended as being limiting and that the concepts that have been brought to light are considered to be applicable to a wide range of combinations of RS symbol sizes and data symbol sizes.

Figure 14:
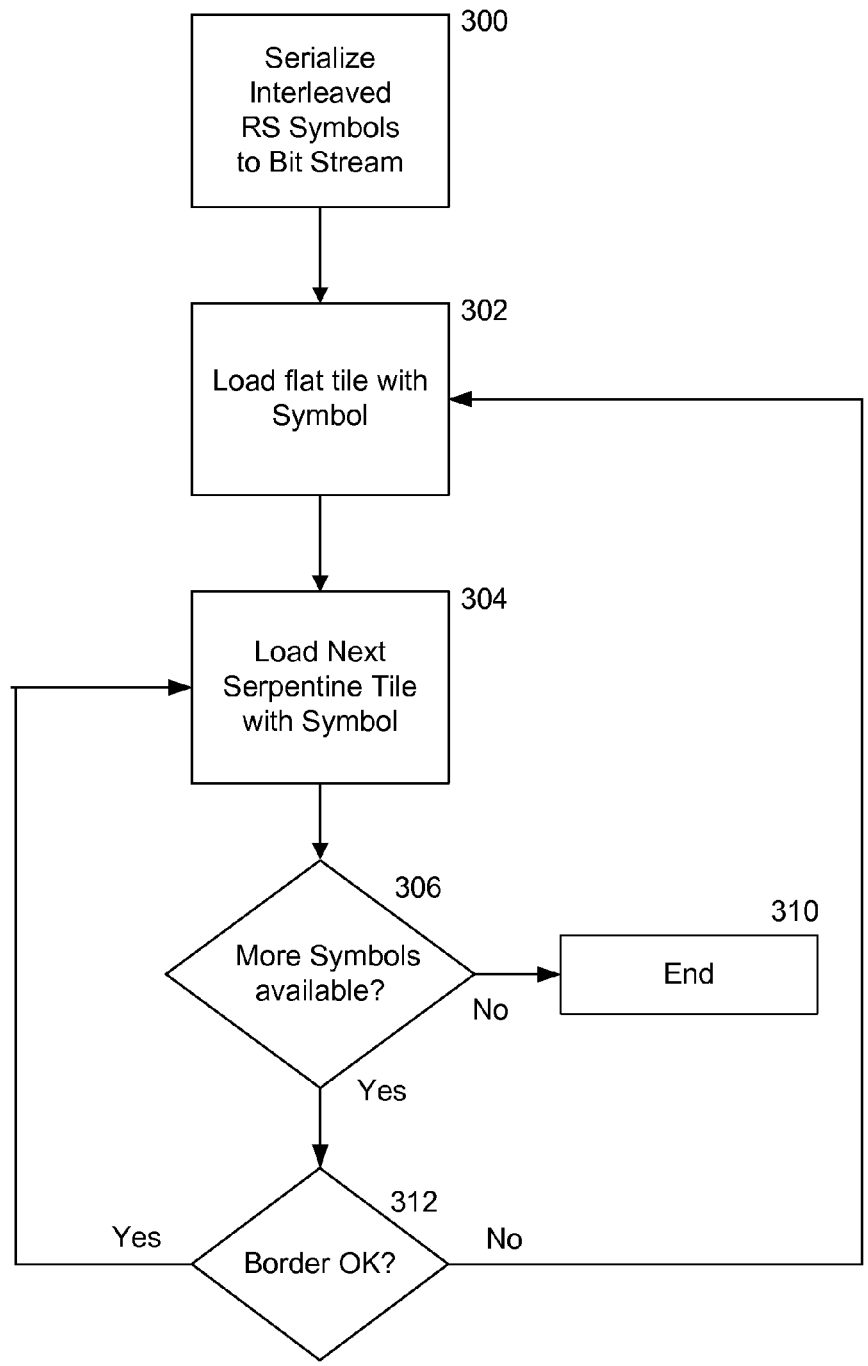
FIG. 14 is a flow diagram which illustrates one embodiment of a method for packing symbols into the data mosaic of FIGS. 12 and 13.

Referring to FIG. 14, a flow diagram is presented which illustrates one embodiment of a packing technique that produces the mosaic of FIGS. 12 and 13. Initially, at 300, the RS symbols can be serialized preparatory to packing. At 302, a flat tile is loaded with an RS symbol. This symbol can include TCM encoding. At 304, the next serpentine tile is loaded with an RS symbol. At 306, a test determines if additional symbols remain to be packed. If not, the process ends at 310. If, however, there are additional symbols, at 312 the leading border is tested to determine if any bits of the last serpentine tile to be loaded fall have crossed the border. In some cases, the bits of the last serpentine may pack against the border perfectly which is treated as if the border has been crossed. In either case, the next flat tile is then loaded with a symbol at 302. If no bits have surpassed the border or the last serpentine tile did not pack perfectly against the border, the next serpentine tile is loaded at 304. It is considered that this packing technique enjoys broad applicability. For example, it is not limited to the use of Reed Solomon symbols and may readily be adapted to a wide range of mosaics and associated tile patterns. These tile patterns may subject more than one data bit to a flat tile in combination with at least two other data bits being subjected to a serpentine pattern. Moreover, the flat tiles may be of different lengths such that different borders can be tested at different times.

Figure 15:
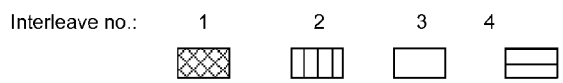
FIG. 15 is a diagrammatic illustration of one embodiment of a data structure that can be imposed on an arrangement of 40 memory cells, each of which memory cells can store a 4 bit value or symbol.

Referring to FIG. 15, one embodiment of a data structure is generally indicated by the reference number 400 and is diagrammatically illustrated. Data structure 400 may be imposed on an arrangement of memory cells M1-M40 that are shown in four groups of ten. In the present example, each memory cell stores four bit values wherein a rightmost column indicates the bit 0 value and bits 1-3 are shown to the left of the bit 0 column. These memory cells can be addressable in a sequential manner, although this is not a requirement. Further, a distribution of four interleaves of data is illustrated throughout the data structure with each interleave containing Reed Solomon symbols that can be produced from a respective one of four blocks of data. It is noted that a key 402 is provided which shows the various regions that form the interleaves. The first interleave is illustrated using an orthogonally intersecting cross hatch that is applied to those bit positions containing the first interleave. The second interleave is illustrated using a vertical cross hatch that is applied to those bit positions containing the second interleave. The third interleave is illustrated using no cross hatch applied to the bit positions that contain this data. The fourth interleave is illustrated using a horizontal cross hatch applied to the bit positions that contain this data. Data structure 400 further imposes a mosaic on the memory cells that is made up of a pattern of mosaic tiles, each of which can contain one ten bit Reed Solomon symbol at a given time. In the present example, the first 40 memory cells are shown, with the bits of these memory cells having been assigned Mosaic Tile (MT) numbers MT-1 through MT-16. It is noted that TCM encoding has not been applied to bit 0 in the present example such that ten Reed Solomon bit locations are encompassed by each mosaic tile, with the individual Reed Solomon bit numbers being designated in each mosaic tile as 0-9. For MT-2 through MT-4, MT-6 through MT-8, MT-10 through MT-12, and MT-14 through MT-16, the Reed Solomon bit numbers are arranged in the serpentine fashion which ranges across bits 1-3 of the memory cells, as illustrated, before proceeding to use bits of an adjacent memory cell. For example, in MT-2, bits 1-3 of memory cell 2 contain Reed Solomon bits 4-6, respectively. Bits 1-3 of memory cell 1 contain Reed Solomon bits 7-9, respectively. The Mosaic Tiles which contain Reed Solomon bits arranged in a serpentine pattern may be referred to as serpentine tiles. In contrast, MT-1, MT-5, MT-9 and MT-13 may be referred to as flat tiles, since these four MTs contain all bit zeros for memory cells 1-40 within four Reed Solomon symbols. Again, the flat tiles are most likely to be subject to error since these tiles contain the bit zero values for every memory cell, thereby increasing the likelihood of a burst of errors appearing in a single Reed Solomon symbol such that the overall correction capability of the RS code is more likely to be capable of correcting all of the errors, as discussed above, but without using TCM encoding.

Figure 16:
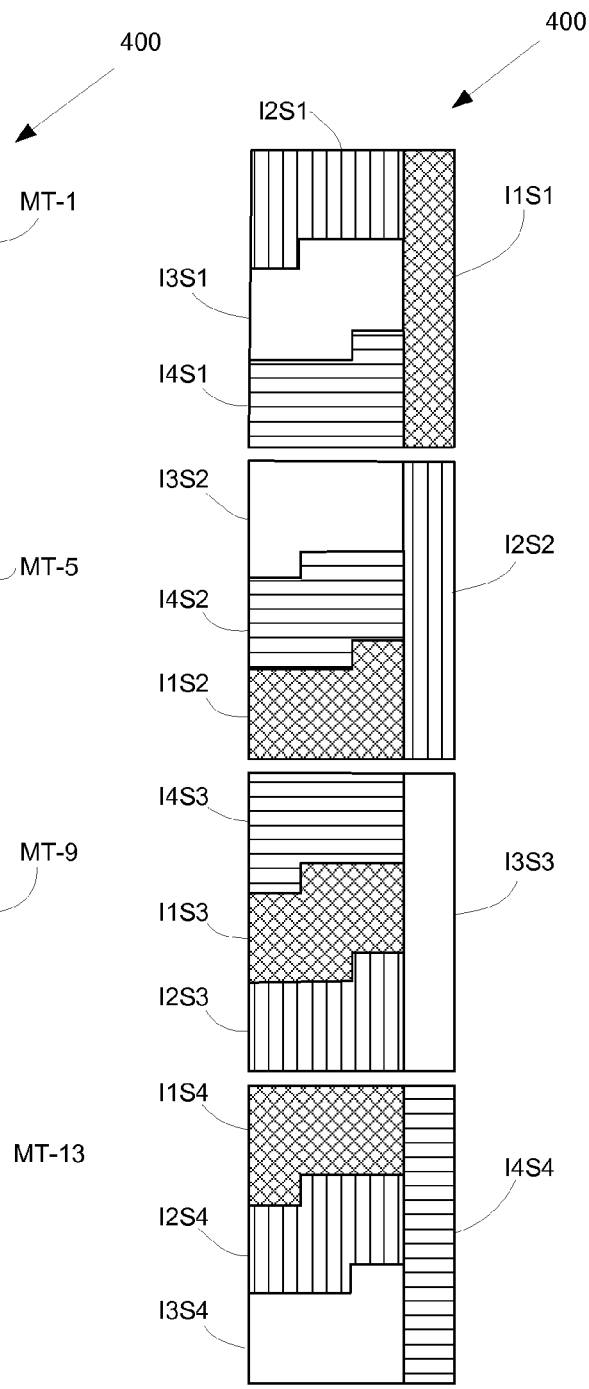
FIG. 16 is another diagrammatic illustration of the data structure of FIG. 15 shown here to illustrate other aspects of the interleaves and symbols contained therein.

Referring to FIG. 16 in conjunction with FIG. 15, the former illustrates the mosaic tiles of FIG. 15 without individual designations of memory cell bits and memory cells in order to clearly show the tiles, but with designations of the RS symbols contained by each tile according to interleave and symbol number. Specifically, tiles are designated in FIG. 16 as IxSy, as in FIG. 12, where x is the interleave number and y is the symbol number for the associated interleave. Thus, by way of example, I2S4 is the fourth RS symbol of the second interleave. It should be appreciated that additional error protection is realized through the rotation of the four interleaves among the tile positions, as illustrated, protecting any one interleave from being subject to relatively more error probability. That is, each interleave appears one time in the flat tile position (bit 0 in FIG. 15) during the illustrated complete sequence of the overall mosaic. Accordingly, the error probability associated with memory cell bit zero is distributed evenly among the interleaves. It is noted that the illustrated mosaic of FIGS. 15 and 16 has been provided by way of example and the teachings that have been brought to light can be applied to a broad range of data arrangements.

Using the specification to this point and figures, it is considered that one ordinary skill in the art can readily implement a controller or like apparatus and associated methods in view of the teachings therein. The following disclosure and subsequent figures are provided for still further explanatory purposes.

A controller for a data storage system is a device that makes it possible for a host computer to store and retrieve information to and from, respectively, the storage system's media. The controller presents to its host a set of addressable storage units to which data may be stored. The controller accesses these units on behalf of its host by receiving and executing commands issued by the host and implements functionality that translates these commands into low-level read/write and other transactions with the media. The definition of "host" or "host computer" is any device that connects to the controller via an interface that transfers data to and from the host as a result of command-level interactions between the host and the controller. By this definition, the host may or may not be a computer that executes application programs; for one example among many possibilities, it could be another memory controller (such as a RAID controller). The design of this interface can be unique or can be compliant with one of many interfaces defined by standards-based specifications. Data transfer involving the storage media in the storage system, in both directions, is the primary service provided by the controller. Controller functionality is typically implemented as a combination of hardware and software elements: the particular mix comprises an architecture resulting from choices made about performance and cost, among others. Usually, there are types of functions that are by their nature either implemented as hardware or as software. Where there is a choice, the decision criterion is commonly based on a compromise among considerations related to cost and/or performance. Ancillary controller services manage media resources, and ensure the integrity of stored and retrieved information. Additional services that might be included in the controller, but that are not mandatory, can be, for example, data security, or power management.

A controller's implementation is necessarily specific to the system role for which it is designed. What kind(s) of host and expected demands therefrom, as well as the technology and extent of the storage media itself are the some considerations from which the functional design requirements can originate. In the case of NAND flash memory, there is an established practice in the design of controllers for NAND flash devices.

Controller design targeting NAND flash is in this document exemplary. Aspects of a controller that supports particular needs of multi-level NAND flash storage also apply to other non-volatile storage technologies, including, but not limited to phase change memory (P-RAM), and resistive memory (R-RAM).

A data storage system comprised of non-volatile media that successfully stores and retrieves error free information can use various techniques, for example, as described above with regard to FIGS. 1-17, to overcome media imperfections that are exaggerated when storing multiple levels in each cell comprising the memory devices. Media imperfections, take the form of noise regardless of the number of levels stored in each cell, and interactions between each cell and its neighbors can generate distortions that add to the noise. The greater the number of levels stored per cell, the greater is the influence of noise, and so, techniques that store and retrieve error free data must be more robust (which usually requires greater sophistication, and more coding overhead) than corresponding techniques for storage of fewer levels.

The following describes at least one embodiment which creates a mechanism and associated method that is particularly suited to per-cell storage of 3 or more bits (8 or more levels per symbol) in media cells characterized by an acceptable amount of noise. The result of this mechanism's application is an optimal balance of data storage capacity in the presence of noise, storage capacity, retrieval performance, application flexibility, and economy of implementation. Realization of the mechanism and its application to non-volatile memory media is the basis of the system being described.

Briefly stated, the apparatus and associated method may be realized by the construction of hardware and software that perform a data storage error detection and correction process by some combination of one or more of the four elements that are listed immediately hereinafter (all but one of which are described above):

(1) Trellis Coded Modulation (TCM),
(2) Bit stream encoding,
(3) an adjunct error detection and correction function, and
(4) system-oriented pre-compensation and post-compensation functions (optional)

All four of these elements may be non-generic in the context of a particular controller design. Each can be configured with some set of parameters that defines the bounds of its behavior and performance, and the mechanism may be "tunable" so as to accommodate a range of media devices, each with particular noise characteristics, as well as a range of bit-density settings. The "tunability" attribute of a controller can provide the capability to vary the aforementioned parameters in accordance with characteristics of memory media that may change during the course of operation by the controller.

Elements (1), (2), and (3) above may take the form of a method and an apparatus that encode data prior to storing it on the memory media on the one hand, and a method and an apparatus that decodes the data after it has been retrieved from the memory media on the other hand. Hence, a controller implemented using these techniques includes an apparatus for encoding and an apparatus for decoding. Element (4) above comprises a method and an apparatus that operate in parallel with and largely independently from the encode and decode processes of (1), (2), and (3). However, the pre-compensation and post-compensation apparatus, element (4), monitors data flows in the controller and in this respect is a controller component that is integrated with encode and decode flows; actual compensation occurs through the application of compensation values to data passing through the encoding or decoding flow. The encoding and decoding aspects are common to memory controllers in general to the extent that all such controllers support read and write processes. However, distinguishing properties of the described system differentiate such a controller from systems that use prior art read and write processes TCM encoding and decoding in the controller may be configured using the aforementioned "tunability" attribute in order achieve optimal performance with particular memory media. Programmable configuration parameters include: convolution polynomials, code puncture polynomials, constellation mapping functions, and the convolutionally encoded subset of each TCM symbol.

Encoding in this system, as described above, can be a method and corresponding apparatus by which TCM symbols are allocated to codewords of the adjunct error detection and correction (ECC) function according to the probability of failure of each bit in each TCM symbol. For example, consistent with the property recognized above that in a multi-level storage system, bits of lesser significance in a symbol exhibit higher probability of error than bits of greater significance, the Encoding/Decoding function allocates less significant bits from TCM symbols correspondingly more ECC power than more significant bits. In addition, because of a behavior exhibited by the TCM decoding function that tends to propagate errors in the event of a decoding failure, multiple bit errors are observed in decoded TCM symbol streams that are correlated with decoding failure events and not, strictly speaking, determined by the higher probability of less significant bit errors relative to more significant bits (as described above). Accordingly, an additional attribute of the described system as implemented may be the allocation of TCM symbols to error correction power so as to provide a best possible balance between ECC correction capacity and the combination of relative probability of less significant bits versus more significant bits, and TCM error propagation.

The adjunct error detection and correction (ECC) function may be any encoding and decoding process that detects and corrects erroneous information during the decoding process. The most desirable ECC implementation, when used with TCM, may be one that uses a multiple interleave Reed-Solomon code. However, narrow sense BCH (as an example) could be used with equal validity even though corresponding encoding parameters for optimum BCH usage would be different than those for Reed-Solomon usage. Other embodiments may use adjunct ECC functions that are yet to be developed.

Pre-compensation and post-compensation may be culminations of the method and apparatus that factors-in corrections to the TCM symbol stream before it is written in the case of pre-compensation, or before it is decoded in the case of post-compensation. The overall compensation scheme, in terms of apparatus and associated method, can overcome several difficulties by operating independently of the encoding process and the decoding process, and imposes no processing overhead on the controller's embedded microcontroller (other than supervisory oversight by the controller's software). The compensation scheme functions by monitoring encoding and decoding flows in the controller so as to accumulate information about how data in the flow can be conditioned to mitigate noise independent of the actual decoding flow. The method and apparatus uses the accumulated information to maintain an arrangement used by the controller (usually a look-up table-based approach) to actually apply pre-compensation or post-compensation to the data streams. The generality of compensation hardware combined with the look-up table based approach is advantageous in and by itself. Compensation flexibility can advantageously be maintained even using combinations of the four elements listed above, and this flexibility makes it possible to compensate not only for well-understood data distortion behaviors associated with the medium, but also to programmatically compensate for unforeseen effects, and even non-linear effects.

Encoding Description

Figure 17:
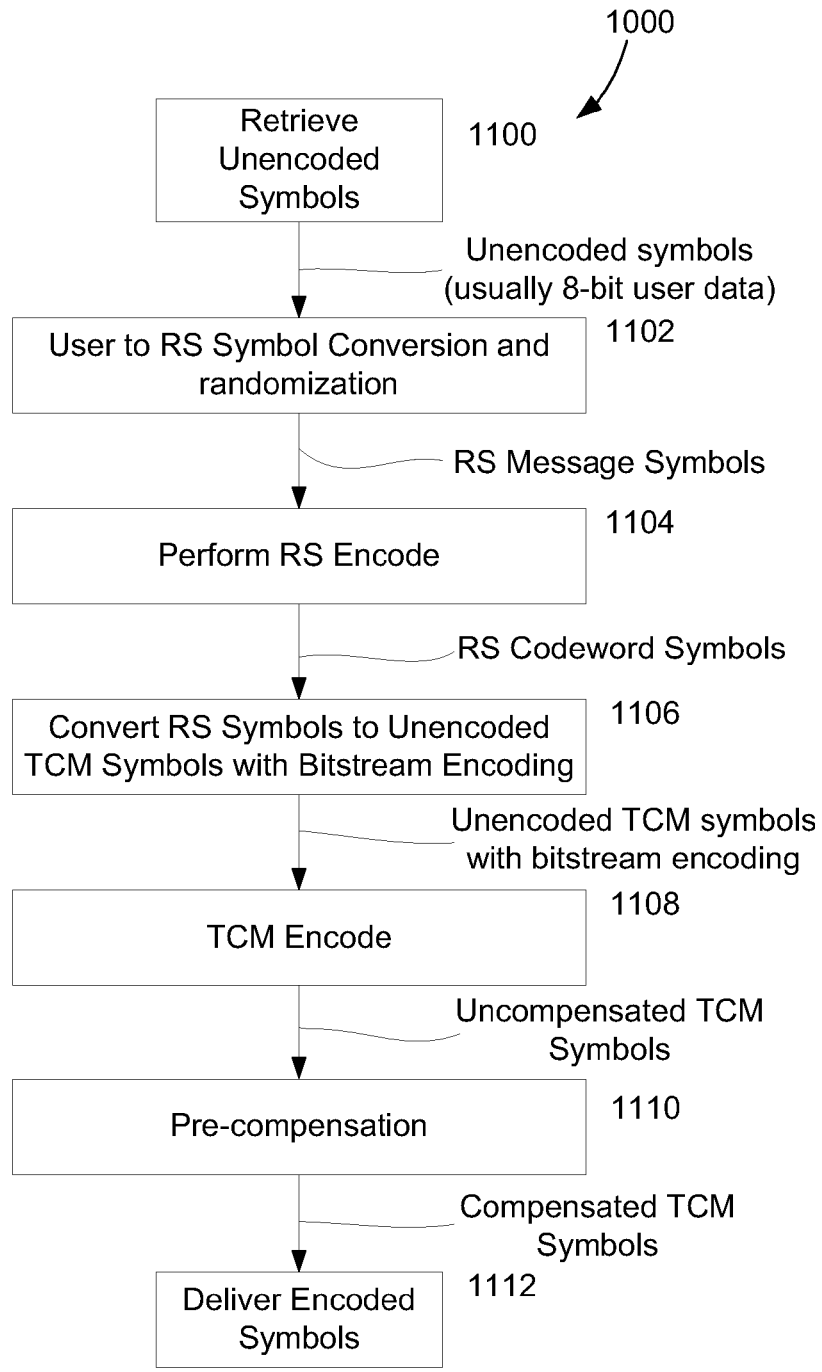
FIG. 17 is a flow diagram that illustrates one embodiment of an encoding method that can be performed by a controller operating in accordance with the present disclosure.

Attention is now directed to FIG. 17 which illustrates one embodiment of an encoding method that is generally indicated by the reference number 1000 and is executable by a controller that is operating in accordance with the teachings above. Generally, the figure shows the encoding flow starting with un-encoded symbols at the top of the figure and finishing at the bottom of the figure with the output of pre-compensated TCM symbols that constitute an encoded result of the process. Each step of method 1000 is described immediately hereinafter.

At step 1100, it should be appreciated that un-encoded symbols, henceforth referred to as "user data symbols", may be obtained in various ways. For simplicity, all possible ways user data symbols may be supplied to the encoder are termed the "source". For example, symbols may be contained in a buffer memory which itself could be either internal to or external to the controller. Such memory-buffered symbols may be read from the memory into the encoding flow after having been transferred from some other location to the memory. As another example, the user data symbols can be sourced directly from an interface as the source that connects directly to the host computer which issues commands, sends and receives data with the controller (and its attached memory devices). As yet another possibility, user data symbols can be generated internal to the controller itself.

User data symbols can have two properties defined by specific parameters that are also parameters controlling the encoding flow. These parameters are symbol format and block length.

Symbol format is the width of each symbol as understood by the ultimate user of the data being stored and retrieved. In multi-level recording systems, the width of the stored and retrieved symbol may itself be variable, and width as a parameter may be referred to as the "bit density" setting. The ultimate user may be the host computer connected to the controller, but may also be the controller itself. A user data symbol is normally 8-bits wide. User data symbols may be conveyed to the encoding process as a series of these 8-bit units, by a series of multiples of the 8-bit units, e.g., 32-bits (or 4 symbols) as an increment or at a time, or by a series of sub-multiples of the 8-bit units, e.g., 4-bits per increment. The width in User Data Symbols may be any value designed to work with a particular embodiment.

Block length is a property consistent with storage and retrieval of user data symbols that is generally seen with file-oriented storage devices. Encoding and decoding methods are designed such that they require data symbols being encoded to be finite in number, and this finite number, whatever it is, is called the "block length." In some embodiments of the controller, variable block lengths may be accommodated, but the number of possible block lengths may tend to be finite, rather than unbounded. There is no hard constraint on the number of block lengths, but defining an exact number serves to simplify the task set executed by the controller. Block lengths in memory devices can range from a few dozen user symbols, or less, to a few thousand user symbols; some subsystems maintain the specific length as a set parameter adopted by an entire storage device, and some memory systems may allow more than one block length to apply, and still other memory systems may allow the block length parameter to be dynamically varied within the allowed possibilities. Adjunct block length parameters may be present in a given memory subsystem even if the parameters are never used for blocks of user data symbols. Instead, these adjunct block lengths can be used for classes of non-user-data transactions such as meta-data transferred in conjunction with file system, internal addressing and wear leveling, among other transactions.

Accordingly, encoding method 1000 can be applied to block-length sequences of user data symbols obtained from Retrieve Unencoded Symbols 1100.

By way of example, in step 1102, user data symbols are converted to Reed-Solomon symbols. In any given controller embodiment, user data symbols can be presented as a series of units, each unit being comprised of some multiple of User Data Symbols that constitutes the encoding and decoding data path width, and this data path width may vary from one controller embodiment to another without changing essential properties of the system. Likewise, components of a controller's embodiment concerned with Reed Solomon processing may utilize a data path width from among multiple possibilities without altering desired system attributes. The use of Reed Solomon encoding, too, is exemplary, since it would be possible for a particular controller implementation to use, for example, a narrow-sense BCH realization instead of Reed Solomon, or any other suitable ECC. Moreover, an adjunct Error Correction technique that has yet to be developed may be found to be suitable.

Symbol conversion generally is a width conversion: no information is added in the process of doing the conversion. One exception is the situation in which fill bits can be added to the final Reed-Solomon symbol in order to finish conversion of an integral number of user symbols into an integral number of Reed-Solomon symbols.

For example, the user data block length might be chosen as 24 bytes which contains 24*8, or 192 bits; and the Reed-Solomon symbol size might be chosen as 9 bits. So, the conversion from user data format to Reed-Solomon format would be a conversion of 24 user data symbols (bytes) to 22, 9-bit Reed Solomon symbols. Because 22*9=198, the number of bits in the resultant Reed-Solomon symbols exceeds the number of bits in the 24 user data bytes by 22*9−24*8=6 bits, hence the final Reed Solomon symbol generated from the conversion is comprised of 6 fill bits in addition to the 3 bits obtained from the user data block.

The result of step 1102 is the user data block expressed as a block of Reed-Solomon symbols. When the Reed-Solomon symbol size is different from the user data symbol size, the symbol count of the resultant Reed-Solomon symbols is different from the user data symbol count. If the Reed-Solomon symbol contains more bits than the user data symbol, then this count is less than the user data symbol count, and the reverse would be true were the Reed-Solomon symbol to contain fewer bits than the user data symbol Of course, this flow is exemplary, and so if narrow sense BCH were to be applied instead of Reed Solomon, the symbols would be bits, and the number of bits presented at each process step would be a bit multiple rather than a Reed-Solomon symbol multiple.

The symbols generated by step 1102 are un-encoded in that they still contain only user data information (with the possibility of inserted fill bits to the final symbol), although here the symbols are the result of conversion from user data format.

An RS encode step 1104 is a parity calculation step. Since Reed-Solomon is an exemplary flow in this discussion, the encoding process would be equally valid for a narrow-sense BCH, in which a BCH encoding process would also be a parity calculation function. In either case, the parity calculation process takes as input Reed-Solomon (or BCH) symbols, and finishes by appending parity in the form of Reed-Solomon (or BCH) symbols, respectively. This process step produces as output the same block of symbols presented as input plus an additional set of symbols comprising the parity.

An optional randomizing step (not shown) can be performed just after RS (or BCH) parity calculation. The randomization can be achieved by applying a transformation function that randomizes the symbols in a way that is independent of both symbol values and of subsequent encoding (and decoding) processes; as a result, the inverse transformation is easily applied during the read-back and decoding processes. The randomization step minimizes sensitivities in encoding and decoding flows to influence of patterns that might appear in real data. The tendency toward sensitivity to particular data patterns is a phenomenon commonly observed among practitioners of the art relative to the content of this disclosure. The number of parity symbols is determined by parameters associated with the particular encoding. Key among these are the correction capacity, in symbols, of the selected encoding (whether Reed-Solomon or BCH), and the number of interleaves encoded.

The result of encoding step 1104) is a block of encoded symbols, the form of which is consistent with prevailing practice which would be recognizable to practitioners of ordinary skill in the art. If a Reed Solomon code is used, the output block is comprised of a message portion which is the same length as the input symbols from step 1102 followed by a parity field containing an additional number of symbols defined by the Reed-Solomon correction capacity and the number of interleaves. It should be noted that the message symbols and the parity symbols may have been randomized, so values of the message portion can be different from the original message, and the parity portion may be randomized relative to parity symbols calculated by the encoder. If BCH is used, the output symbols include the bits of the original user data message followed by the parity field. The BCH parity field contains a specific number of bits which is dependent on BCH parameters that include, but are not limited to, the bit correcting capacity of the selected BCH configuration, and the number of interleaves. The remaining determinant of BCH parity size in the result from step 1104 is the configuration of the defining generator polynomial for the specific implementation.

In step 1106, RS symbols are converted to unencoded TCM symbols using bitstream encoding as taught above (see, for example, FIG. 12). While this step is another data conversion function, in contrast to the conversion of user data to Reed-Solomon (or BCH) symbols, step 1106 involves application of encoding rules to incoming symbols to produce a block of un-encoded TCM symbols. The encoding rules constitute a transformation that reorganizes the Reed-Solomon (or BCH) symbols into a data structure which, by way of example, can have the form and properties of the mosaic structure described with regard to FIGS. 12 and 13, and implemented by the method of FIG. 14. This step is particular to specific embodiments of a controller produced according to this disclosure since for purposes of integrating the selected Reed-Solomon (or BCH) realization with a selected TCM realization so that together they can cooperate to provide an encoding with an optimum combination of correcting power and encoding overhead. The conversion is sensitive to parameters in the Reed-Solomon (or BCH) and TCM encoder configuration that, in turn, influences parameters in the conversion process. These parameters include:

For Reed-Solomon or (BCH), symbol size, symbol correction capacity (T), and the number of interleaves.

For TCM, number of bits from each un-encoded TCM symbol that are convolutionally encoded, convolution polynomial, and the puncture configuration.

The result of step 1106 is a block of symbols that have been transformed by Reed-Solomon encoding and randomization, and which have been resized to fit the symbol width of the TCM encoder. Attendant to the result of conversion 1106 is the allocation of the symbol set from step 1104 into TCM symbols with RS (or BCH) interleaves dedicated to TCM input symbols in accordance with the higher relative probabilities of LSB errors as well as the correlation of errors in non-LSBs (i.e., bits of greater significance than the LSB) with errors in LSBs (due to TCM decoding errors in the decoder). Hence, a specific flow definition in step 1106 relative to configurations of RS (or BCH) and TCM, can define the un-encoded TCM symbols as a data structure consistent, for example, with the format described earlier and illustrated by FIGS. 12 and 13. By this criterion, the result is to apply the highest correction power to the LSB that has the highest probability of error.

A TCM encoding step 1108 is uses the symbols from step 1106. This process is well-understood in the art and there are many examples in the engineering literature. The particular encoding process can be tuned to the memory media being accessed by the controller, and so different controller embodiments can be fitted with appropriate configuration parameters. In this sense, the TCM configuration can be a determinant to the configuration of accompanying Reed-Solomon (or BCH) realizations as well as to the encoding process step.

The result of TCM encoding 1108) is a block of encoded TCM symbols. These symbols are "pure" in the sense that they represent exact multi-level Memory Cell Storage Targets to be stored in suitable form (an amount of charge, a resistance, etc.) in non-volatile media. At this point, the encoding process has added coding overhead in the form of RS (or BCH) parity and TCM overhead. It is randomized data both explicitly by randomization that may be performed in step 1102 and by the action of the convolutional encoder. Accordingly, the symbols available at this point in the flow are no longer recognizable as user data. Nevertheless, the symbols contain redundancy by which data errors induced during the write and read process can be corrected and the original (stored) user data symbols completely recovered.

A pre-compensation step 1110) may be applied as an option in some embodiments. As with other approaches to data storage, it is possible to apply compensation to data before it is written to the media in order to counter known distortions. With non-volatile storage technologies, some distortion mechanisms are well-understood, and some, as with emerging non-volatile technologies may not be well-understood. Consequently, pre-compensation can apply a generalized process that makes adjustments for known mechanisms in memory such as, for example, NAND flash, but which has the flexibility to be reprogrammed for other types of memory.

The result of pre-compensation, if applied in this embodiment, is a block of encoded and compensated TCM symbols. As of step 1110, these symbols represent the actual Memory Cell Target Values that will be applied during the write process to whichever non-volatile storage medium is attached to the controller.

Deliver Encoded Symbols provides the resultant symbols culminating from steps 1110 to 1112.

Decoding Description

Figure 18:
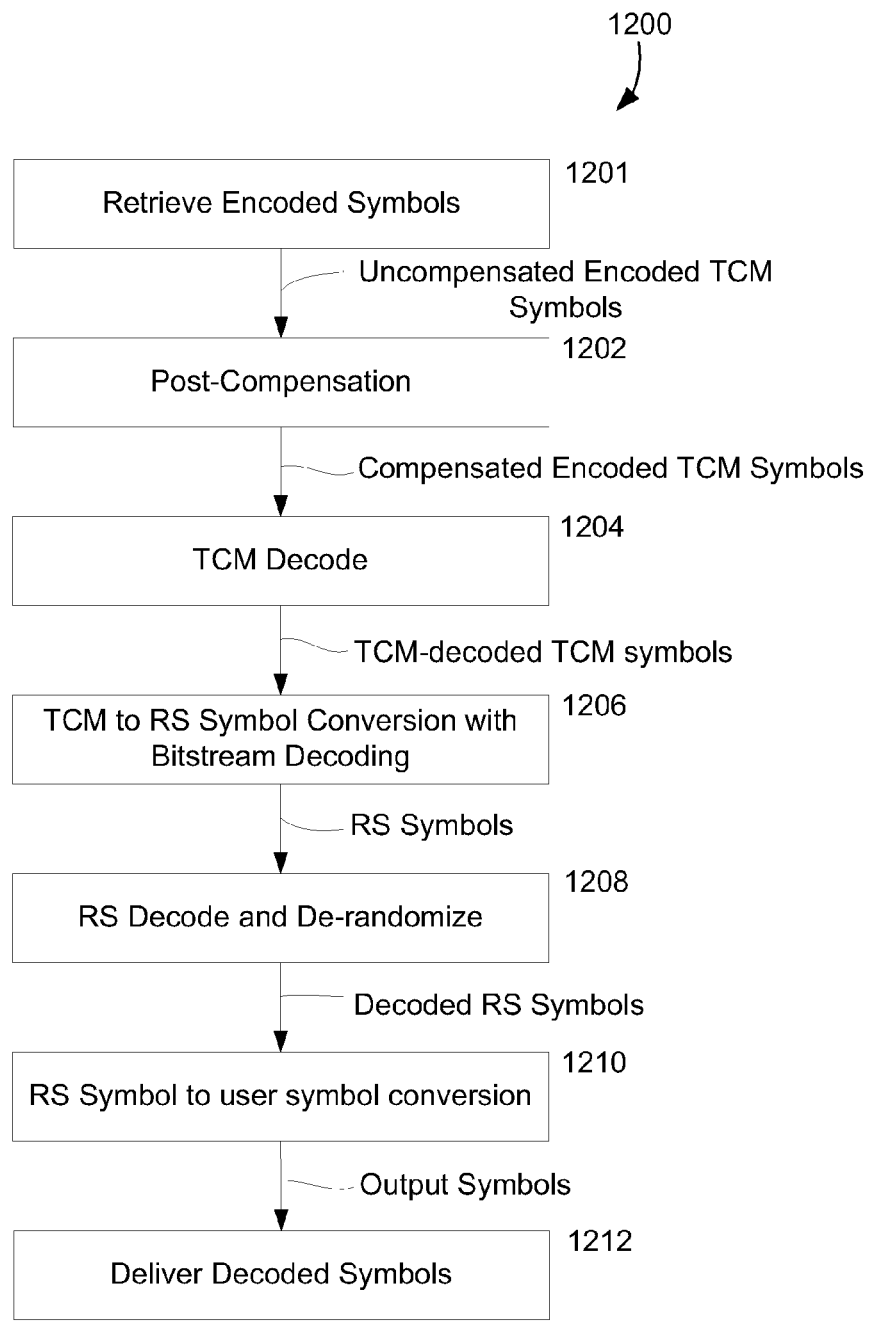
FIG. 18 is a flow diagram that illustrates one embodiment of a decoding method that can be performed by a controller operating in accordance with the present disclosure.

Referring to FIG. 18, attention is now directed to one embodiment of a decoding method, generally indicated by the reference number 1200, which may be employed by a controller that is configured in accordance with the present disclosure.

A Retrieve Encoded Symbols step 1201 represents a generalized read method that a controller can use to retrieve TCM symbols from a storage medium. A read method that supports retrieval of multi-level symbols from NAND flash as a source of symbols to the decoder is one suitable, but non-limiting example. Another suitable example resides in a read method that supports retrieval of multi-level symbols from a phase-change memory (PCM) device, as are read processes that attach to multi-level devices of other technologies. Similarly, read methods that support retrieval of symbols from other non-volatile memory devices serve as additional examples.

It should be appreciated that Read Encoded Symbols 1201 generates sequences of encoded TCM symbols. A given sequence can correspond to a single data block. At this point, the symbols have received no conditioning in the process of being retrieved, for example, from memory media. Hence, the symbols represent data symbols as stored in the memory medium, which are as yet unprocessed by the read-back apparatus. In accordance with the properties and requirements of the TCM decoding method, these symbols can comprise a data portion corresponding to the number of data bits being stored in each memory cell (e.g., 3 bits, 4 bits, or greater), and a "soft" portion that pinpoints a multi-level Memory Cell Target Value with precision greater than that possible with the data portion of the value alone. Normally, the data plus soft bits of each sample are the result of an analog to digital conversion (ADC) obtained after sensing a memory cell's contents; this conversion is part of the Read Encoded Symbols process in (1201).

An optional post-compensation step can be applied at 1202. With regard to this step, it should be appreciated that distortions to originally targeted symbol values occur as a by-product of these symbols having been stored in specific memory cells and then retrieved by a read/retrieval method. To the extent that these distortions are understood and reproducible by one or more processes in the controller, Post-Compensation can be applied.

Post-Compensation 1202, if applied, results in sequences of compensated TCM symbols that are still in TCM-encoded form. By removing predictable distortions from the symbols returned from the Read Encoded Symbols step 1201, some of the noise present in retrieved symbols is removed, thereby reducing the error correction overhead required of the remaining decoding steps relative to what the error correction overhead would have been with no Post-Compensation. Hence, post-compensation can serve to reduce noise. In effect, the symbols at this point in the decoding process are the same symbols as would be obtained directly from step 1201 except that they are less noisy. In an embodiment that does not use post-compensation, step 1204 can operate directly on the symbols retrieved by the Read Encoded Symbols process 1201.

A TCM decode step 1204) decodes TCM symbols obtained, for example, from step 1202 by producing symbols that are the same (or close to the same) as the symbols originally input to the encoder. When some of the result symbols differ from original symbols input to the encoder, the variance is generally the result of TCM decoding error(s) due to misinterpretation of the encoded input symbols. Usually, distortions introduced via juxtaposition of Encoder Deliver Encoded Symbols Step 1112 (see FIG. 17) with Decoder Retrieve Encoded Symbols Step 1201 have resulted in noise that exceeded the TCM decoder's ability to remove the resulting errors. This is also in light of whatever Pre-Compensation and Post-Compensation steps may have been executed in line with Encoder Deliver Encoded Symbols and Decoder Retrieve Encoded Symbol steps. TCM decoding is well understood by practitioners of the controller and Data Communications arts, but is considered to provide heretofore unseen advantages when implemented in light of the teachings herein. As such, it is considered that one having ordinary skill in the art is enabled with respect to practicing the TCM processes described herein with this overall disclosure in hand.

It should be appreciated that one result that is attendant to TCM encoding (see FIG. 17) resides in an expansion of the symbol set which expansion is reversed by the decoding process of FIG. 18.

TCM-decoded TCM symbols are the result of TCM Decode step 1204. These symbols include the Bitstream programming organization effected by the Reed-Solomon to TCM conversion with Bitstream Encoding of step 1106 in FIG. 17. As such, the error configurations introduced by sequence misinterpretation by the TCM decode step (to the extent such misinterpretations may have occurred) are distributed in a predictable way in these symbols. This predictable distribution can be accompanied by subsequent decoding steps in such a way that errors which do occur can be maximally reversed.

At step 1206, conversion of decoded TCM symbols to Reed-Solomon symbols is the result of reformatting a sequence of TCM symbols so that they become a corresponding sequence of Reed-Solomon symbols. Other ECC approaches could be used while still remaining within the bounds of the teachings of this disclosure, so the conversion in this step could be to symbols from a narrow-sense BCH code (for example) with equal validity. Step 1206 is a re-packing of TCM symbols to Reed-Solomon symbols, and it is significant to note that after the conversion is complete, the Bitstream Encoding added during the encoding process (FIG. 17) is still present.

The symbols produced by step 1206 are the result of TCM symbol to the exemplary Reed-Solomon symbol conversion. One function of step 1206 (in addition to the conversion of TCM symbols to adjunct ECC symbols—e.g., Reed-Solomon) can be conversion from the data structures illustrated by FIGS. 12 and 13 as part of the conversion from TCM. The symbols at this point are un-encoded symbols from the ECC code, in FIG. 18 shown as Reed-Solomon by way of example. Other ECC approaches could be applied, with one notable embodiment being narrow-sense BCH. Regardless of the ECC approach used here, it is noted that encoding introduced during the encoding flow is present in these symbols. That is, in the instance of RS, the RS parity symbols are present.

An RS decode step 1208 decodes the symbols received from step 1206. Decoding removes differences that might be present in the decoded symbols relative to the symbols originally generated by RS Encode step 1104 of FIG. 17. The extent of such differences that can be removed is a function of the implementation. Also, parity symbols added during RS Encoding are also removed. This step is conceptually and practically the same if some approach other than Reed-Solomon is chosen. In any embodiment, however, the decoding that is performed is a reversal of that performed during the encoding step, so that both the encoding and decoding are defined by the same ECC configuration. Step 1206 also reverses randomization of it was employed in the encode process.

Decoded RS symbols are "clean" in the sense that all data errors caused by distortions from the storage and retrieval process have been removed at least within the capability of the codes. For a successfully decoded block of symbols, these symbols are identical to the Reed-Solomon message symbols originally input to the Reed-Solomon Encoder.

Step 1210 is effectively the final step in the decoding flow in the sense that its result should be the original set of user data symbols. The exemplary Reed-Solomon symbols from step 1208 are converted to user data symbols. Because of the encoding still in effect, the step is more than a simple change of symbol size from Reed-Solomon to User Data symbols: the function performed here is to reassemble user bytes from ECC interleaves that contain bits of lesser significance as distinct from interleaves that contain bits of greater significance. Some interleaves contain only LSBs, and some interleaves contain bits of greater significance. This is another inverse transformation, in that it is intended to be the exact reverse of the forward transformation performed by encoding step 1102 of FIG. 17.

User Data symbols are output symbols from both the decoding flow. They are identically the symbols originally presented by the Encoder's Source (100).

At step 1212, user symbols from step 1210 are sent to the Destination. As with the Retrieve Unencoded Symbols step of the Encoder, there are many suitable ways in which this step can be completed a complete listing of which is not necessary to the overall integrity of the present disclosure.

Encoding Apparatus

Figure 19:
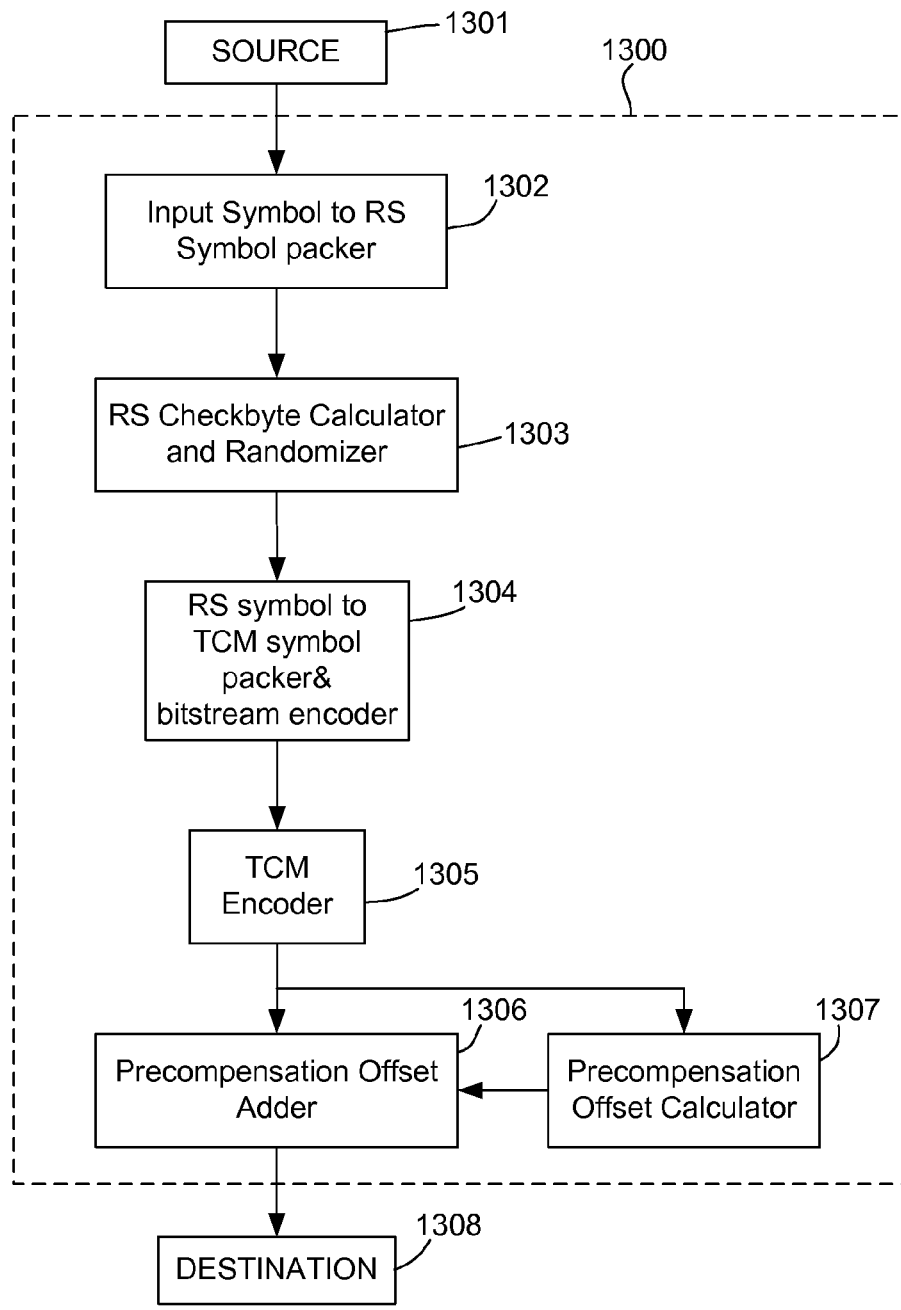
FIG. 19 is a block diagram of one embodiment of a controller including componentry that is directed to the encoding functionality of the controller according to the present disclosure.

FIG. 19 is a block diagram which illustrates one embodiment of a controller 1300, shown within a dashed rectangle, for non-volatile memory. A source 1301 can vary from one controller embodiment to another. Usually, the Source is a memory, but other arrangements can exist in a controller without changing desired attributes of the system. Relative to overall Encoder 1300, the Source supplies User Data Symbols.

An input symbol to RS symbol packer (i.e., RS encoder) is indicated by the reference number 1302. Input symbols, usually as a multiple of 8-bit User Data Symbol values are obtained from Source 1301. Packer 1302 converts each set of 8-bit values into a set of Reed-Solomon symbols and may operate on one input unit per step. Input units can be of any size, but usually the unit size is either one input symbol or a few input symbols, where the input symbols are made up of User Data Symbols. Input symbols are presented as a sequence, and packer 1302 is configured for the exact sequence length that will be encoded. Because the number of User Data Symbols comprising the input sequence is likely to be different than the number of Reed-Solomon symbols that results, the Block Length in symbols can have two values relative to packer 1302. One value (in symbols) is the Block Length in User Data Symbols and the other value is the Block Length in Reed-Solomon symbols. When the number of User Data Symbols does not convert into an integral number of Reed-Solomon symbols, the packer can determine the number of fill bits that need to be inserted into the last Reed-Solomon output symbol in order to achieve an integral multiple of Reed-Solomon symbols in the final output Block of Reed Solomon Symbols.

In one embodiment, the User Input Symbols are 8-bits apiece, which is what would normally be expected, and Reed-Solomon symbols may be 9-bits apiece. This means that each 9 Input symbols would map evenly into 8 Reed-Solomon symbols. In another embodiment, a data block of 100 bytes (Input Symbols) would map onto 89 9-bit Reed-Solomon symbols, with the last Reed-Solomon symbol of the sequence having only 8 of its 9 bits used. In this case, the RS packer can close the sequence by inserting a fill bit into the last Reed-Solomon symbol to be generated. While many embodiments are possible, it is evident that a flexible approach may be employed with regard to configuring the RS packer.

It should be noted that the use of a Reed-Solomon code is an exemplary case and as such represents only one class of embodiments. While Reed-Solomon configurations may be found to be optimal in the context of Encoding, other approaches could be used instead of Reed-Solomon without limitation, the most notable probably being a narrow-sense BCH code. Of course, it is possible that other suitable approaches may be applied that are yet to be developed while still remaining within the purview of this overall disclosure.

A Reed-Solomon Checkbyte calculator 1303 is conventional to the extent that it is well understood as applied to prior art memory controllers. Checkbyte calculator 1303 determines a set of additional Reed-Solomon symbols and appends the additional symbols to the set of input symbols. The appended symbols can be called parity symbols, and the combined Input Symbols plus appended parity comprise a Reed-Solomon codeword. For purposes of flexibility, the Reed-Solomon encode/decode or other suitable configurations may be adaptable by way of programmability, so the Checkbyte Calculator in one embodiment can accommodate variable correction capacity (T), and/or a variable number of interleaves. In some embodiments, programmable symbol width can likewise be a programmable parameter. The extent of programmable parameters can depend on the particular controller architecture and may depend on the selected memory media technology.

Reed-Solomon Checkbyte Calculator 1303 may include a randomizing function which is applied to encoded Reed-Solomon codewords to minimize pattern-sensitivities that might exist in the encode and decode functions. The Randomize function chosen, for any given embodiment, can operate independent of the data values it randomizes, so is not affected by data errors returned after written data is retrieved from the memory.

A Reed-Solomon to TCM Symbol converter 1304, accomplishes one of the features described above with regard, for example, to FIGS. 12 and 13 in order to implement the mosaic tile pattern and perform the RS to TCM symbol conversion. This is the encoding function which allocates bits from the Reed-Solomon symbols into TCM symbols recognizing both the manner in which TCM can convolutionally encode the least significant part of each symbol provided to it, and can encode the remaining most significant part by a TCM constellation mapping transformation. In one embodiment, the least significant part of each TCM symbol allocated to the convolutional part of the encoder is a single bit (i.e., the LSB), though this can also be more than the LSB generally by increasing order of significance. The remaining bits of each symbol are then the most significant part that are transformed by the constellation mapping function alone. The Reed-Solomon to TCM conversion does two things which must be properly executed for the approach to work: first, it allocates the bits of one Reed-Solomon symbol into one or more TCM symbols. In one embodiment, the width of a TCM symbol is normally less than that of a Reed-Solomon symbol, the allocation then results in each Reed-Solomon symbol mapping to more than one TCM symbol. Reed-Solomon (or BCH) configurations that operate with TCM encodings of multi-level symbols (3 bits or more) generally require multiple interleaves to be optimal in terms of error correction performance. Hence, in one feature of packer 1304, Reed-Solomon symbols can be packed into TCM symbols according to interleaves. This means that for a run length characteristic of the mosaic data structure previously described (see FIGS. 12 and 13), bits composing the resultant TCM symbols are taken from Reed-Solomon in a deterministic fashion. At a minimum, each LSB in each resultant TCM symbol is taken from a Reed-Solomon symbol from an interleave designated for TCM LSBs. Allocation of LSBs and MSBs by interleave exhibits a rotation so that, at one stage of the conversion of 1304, a set of LSBs may be taken from an Interleave 0 Reed-Solomon symbol, and at another stage of the conversion a set of LSBs is taken from a symbol from Reed-Solomon Interleave 1. The rotation repeats as a block is converted so that over the course of the block, each Reed-Solomon interleave is allocated a roughly equal number of LSBs. The same sort of rotation applies to TCM bits of greater significance than the LSB such that over the course of a block, each Reed-Solomon Interleave, in turn, has an equal number of LSBs and MSBs, respectively. The total number of Reed-Solomon interleaves may vary (FIGS. 12 and 13 represent one exemplary case).

The preceding assumes that the TCM encoding strategy is one in which convolutional encoding is performed only on the LSBs of the raw symbol stream. In a scenario in which a sufficiently large number of levels is targeted to memory devices, this strategy could become one in which bits of lesser significance from each symbol are convolutionally encoded. For example, a hypothetical multi-level system might target 6-bit TCM symbols in which the 2 bits of lesser significance are convolutionally encoded, while the 4 bits of greater significance are not convolutionally encoded. Furthermore, the convolutional encoding of each of these lesser significant bits may be different from each other. The least significant bit has the highest error probability and the method therefore may apply a convolutional code of higher error correcting capabilities than the next least significant bit with lower error probability than the least significant bit. The next least significant bit can use a convolutional code with error correcting capabilities in accordance with the error probability of this bit location. In this case, the encoding configuration would be more complicated because the Reed-Solomon (or other) code's symbols would need to be distributed into the TCM symbols by a process that integrates with this configuration fact. Applicants are unaware of any use in the prior art of per-bit convolutional codes as taught herein.

One consideration with regard to the conversion performed by converter 1304 from Reed-Solomon symbols to TCM symbols (and conversely by the decoder, yet to be described, that performs a reverse conversion) relates to the convolutional encoding of TCM expanding the number of input symbols in the convolutionally encoded result. Furthermore, in most controller configurations, this expansion is also the result of a puncture parameter that modifies the extent of added redundancy (minimizes the extent) by constraining the total TCM overhead imposed by the encoding process. Accordingly, the Reed-Solomon to TCM symbol conversion must understand exactly the form of the expansion, and insert placeholders (non-occupied bit values) into its resultant TCM symbols for the expansion that will occur when the symbols are encoded. In the case of prior art TCM implementations, this effect (and associated requirement) is well understood by practitioners of the art.

Because a multi-level storage and retrieval system can target non-volatile memory in a generalized way, the controller that implements the multi-level storage system can be flexible and therefore capable of programmatically targeting a range of memory configurations that include variation in the number of bits per Memory Cell Target Value. Accordingly, the encoder (and decoder) can be programmable over a range of encoding (and decoding) configurations. In the case of the Reed-Solomon to TCM symbol conversion, such parameters include the number of Reed-Solomon interleaves, the TCM convolution function, the number of TCM bits of lesser significance convolutionally encoded, the width of TCM symbols (bit density), and the TCM puncture configuration.

A TCM encoder 1305 performs the TCM encoding operation on the un-encoded TCM symbols produced by RS symbol converter 1304. Methods and implementations of TCM encoding are well understood as taught, for example, by Ungerboeck's classic paper entitled "Channel coding with Multilevel/Phase Signals"—IEEE Trans. Info. Theory vol. IT 28, No. 1, January 1982, pp 55-67, but it is considered to provide heretofore unseen advantages when implemented in light of this overall disclosure. Moreover, it is believed that some degree of programmability, though not always seen in prior art instances of TCM, would further differentiate from the prior art.

Output from TCM encoder 1305 is a set of encoded TCM symbols. In this form, each symbol represents, in digital form, a Memory Cell Target Value that includes the data bits (e.g., a 4-bit TCM symbol represents a 4-bit Memory Cell Target Value).

A pre-compensation corrector 1306 and a pre-compensation offset calculator 1307 can implement pre-compensation in the controller, although it is again noted that compensation is an option and not a requirement. It is noted that component 1306 is generally implements a correction application function, usually an adder, and that item 1307 generally implements a calculation function. In 1307, the calculation function may include the reading of one or more other blocks of information than the current block (the block being processed by the flow being described in the Figure). Hence pre-compensation as it is applied to the current block may be the culmination of reading one or more prior blocks in addition to the current block, and the calculation step provided by 1307 may be accomplished by accumulating statistics from those prior blocks that may be used to calculate compensating offsets which are applied to the current block via step 1306.

Resultant symbols from the action of pre-compensation corrector 1306 and pre-compensation offset adder 1307 are Memory Cell Storage Target Values that are at this point ready to be written into the memory. Because each Memory Cell Storage Target Value is intended for a specific cell in the memory medium, pre-compensation and write methods can be coordinated with respect to making sure that write symbols are directed to their intended cells. Pre-Compensation can include significant changes to the uncompensated TCM symbols that were input to these blocks. First, whereas the input symbols had only as many bits per symbol as the width of the TCM symbol (memory symbol width), the pre-compensated symbol can be augmented by soft bits which pinpoint the memory Memory Cell Storage Target Value with sub-memory-bit precision. Secondly, the compensation offset can utilize the soft bits (and in some case the memory bits too, depending on the extent of the applied compensation offset).

Destination 1308 is the generalized location to which compensation symbols are directed. Specific embodiments can vary from controller to controller while remaining within the scope of this overall disclosure. In the encoding scheme, the encoded and pre-compensated symbols are ready for writing into the memory itself, but depending on the controller architecture the path from this point to the memory can be more or less direct. Ultimately, the nature of the Destination is a function of the controller's architecture and should be flexibly interpreted so long as the teachings herein are being applied.

Decoding Apparatus

Figure 20:
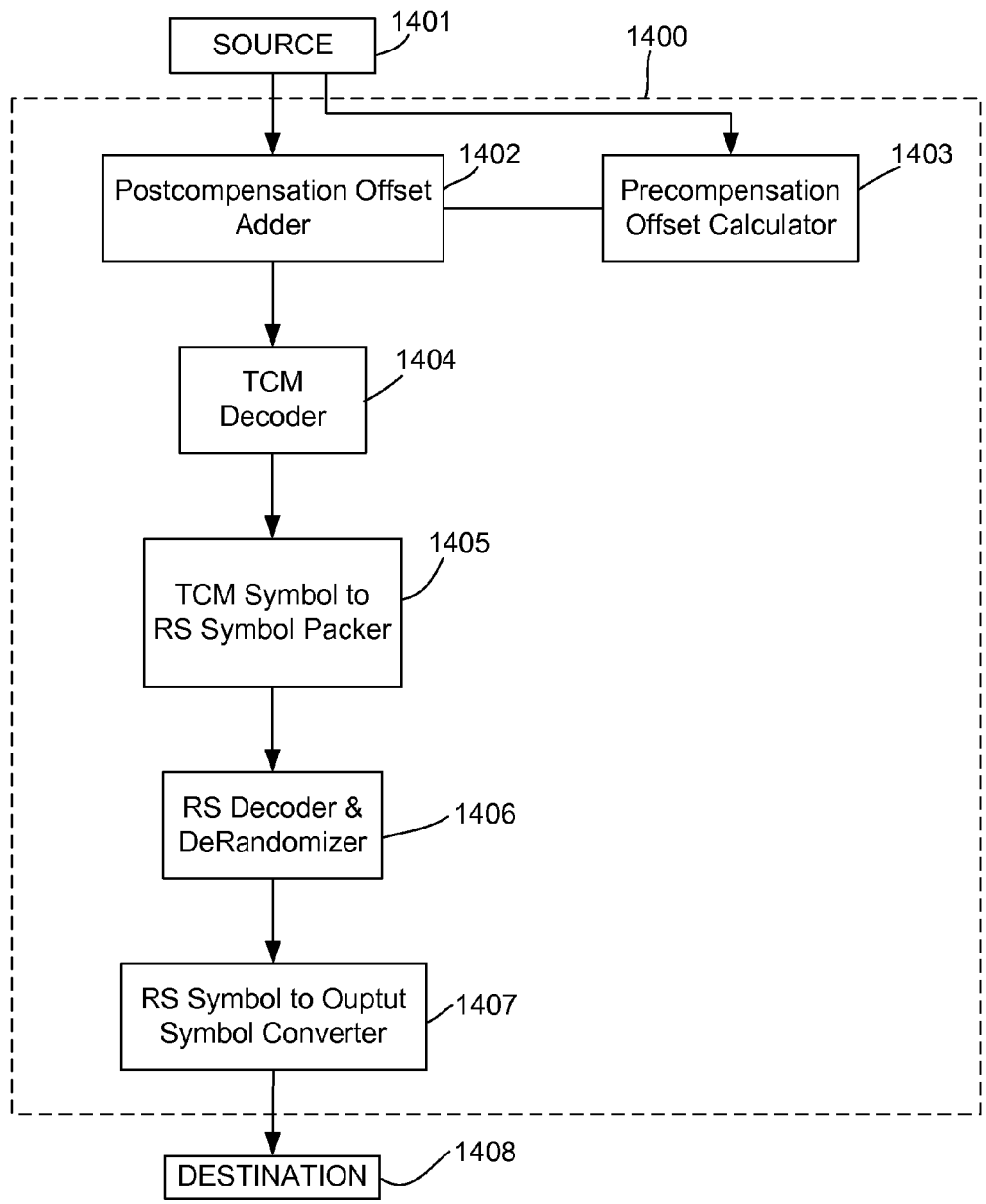
FIG. 20 is a block diagram of one embodiment of a controller including componentry that is directed to the decoding functionality of the controller according to the present disclosure.

Attention is now directed to FIG. 20 which is a block diagram that illustrates one embodiment of a multi-level non-volatile memory controller 1400 that is shown within a dashed rectangle.

Initially, un-encoded TCM symbols are issued to controller 1400 from a Source 1401, which in this block diagram is a generalized representation of any suitable originator of symbols that are intended for decoding. The symbols coming from the source are ultimately memory symbols obtained by the read process that retrieves them from the memory media. The path they follow from the memory into the decoder can vary with embodiments of the controller.

While compensation is itself optional, in this embodiment, a post-compensation offset adder 1402 and a post-compensation offset calculator 1403 may be used. In one embodiment, postcompensation Offset Adder 1402 might be located in the decoder's data path, and postcompensation Offset Calculator 1403 might be another controller component which is shared between the decoder's post-compensation function and the encoder's pre-compensation function (SGxx on compensation).

Source 1401 provides un-encoded TCM symbols to adder 1402 including the significant (data) bits of the TCM symbol (memory symbol) and the soft bits. The number of soft bits can depend on the controller and on the type of memory device; generally this can be three or four bits in addition to the TCM bits themselves. The action of adder 1402 is generally to apply a correction (usually by adding it) to a current TCM symbol. Accordingly, the output of adder 1402 is a corresponding un-encoded TCM symbol (TCM bits plus soft bits) and this result should be, by the method of post-compensation, a less noisy version of the uncompensated input on a symbol by symbol basis. The compensated output serves as input to a TCM decoder, yet to be described. Otherwise, source 1401 can feed symbols directly to the TCM encoder in an embodiment where postcompensation is not used.

It is considered that one having ordinary skill in the art can readily implement a suitable TCM decoder 1404 with this overall disclosure in hand. In this regard, a generalized TCM decoder is well understood in the communications engineering arts. Its main structures include a soft Viterbi detector with traceback memory, and a TCM constellation mapping function. The TCM decoder receives unprocessed TCM symbols supplied by the read process, each of which can include soft bits, and returns decoded set of symbols that have the form of un-encoded TCM symbols (i.e., TCM symbols with no soft bits that include placeholders for punctured convolutional expansion).

A TCM symbol to RS symbol unpacker 1405 is configured to invert the packing process of symbol packer 1304) in the Encoder (FIG. 19). As such, it has the same set of features and constraints as the forward conversion in packer 1304, as well as being the reverse implementation of the encoding.

Generally, unpacker 1405 receives post-compensated and decoded TCM symbols from the TCM decoder and generates Reed-Solomon symbols at its output. The conversion process implemented by this block is the exact inverse of that of the encoding process. Because configurations can vary with respect to TCM parameters, (convolution, puncture, number of LSBs in convolution) and the number of interleaves, the configuration of this functional block should closely reverse the encoded configuration of every data block that it decodes. Resultant Reed-Solomon symbols from unpacker 1405 correspond to each Reed-Solomon symbol that was input to the Reed-Solomon to TCM conversion of the encoder.

A Reed-Solomon Decoder 1406 performs a final error correction step executed in the controller. Decoder 1406 should receive, from TCM Symbol to Reed-Solomon Symbol converter 1405, an exact number of Reed-Solomon message symbols plus parity symbols generated by the Reed-Solomon encoder prior to writing the data. Together, these symbols comprise a returned message that may contain decoding errors passed along by the TCM decoder. The action of Reed-Solomon decoder 1406 is to determine whether any errors are indeed present in the input symbols, correct the errors if present, and output the decoded result as user data symbols.

It has previously been mentioned that implementation of a controller with Reed-Solomon as the error correcting code is exemplary. In the context of the invention, narrow-sense BCH, for example, could be used in a controller with equal validity.

The role of interleaving in the error correction code can provide benefits in view of the disclosure above. In this regard, the Reed-Solomon decoder can be capable of interleaving configurations that are consistent with any applied encoding and TCM configurations that accompany specific multi-level Memory Cell Storage Target Values and specific memory device technologies. In this sense, the Reed-Solomon decoder (and encoder) may be capable of programmability sufficient to support the required system flexibility, and to this end, the decoder may be necessarily reconfigurable with respect to error correction capacity (T), and number of interleaves.

A de-randomization unit can be part of the Reed-Solomon Decoder, which would implement an inverse of the randomize function executed in the Encoder (FIG. 19).

Reed-Solomon decoding results in removal of parity symbols so that only the original data portion of the message is provided to the output. The message symbols at the output of the decoder represent the original data, but the data is still organized as Reed-Solomon symbols.

A converter 1407 receives Reed-Solomon symbols and repacks them into User Data Symbols. Output from symbol converter 1407 can be one byte wide, in which case converted output is transmitted one byte per step, or it can be greater than a byte or a portion of a byte. In embodiments where the output might optimally be the width of a wider memory (e.g., 32-bits), converter 1407 can perform the width expansion and output a full word whenever one becomes available.

Destination 1408 is a generalized representation of the various controller components that might follow the decoder. As with other Source and Destinations shown in the other figures in this document, this one can be implemented in various flexible ways while the teachings herein are nevertheless remain in practice.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. In a system which uses multi-level data encoding where each symbol of a plurality of symbols represents more than one bit of information in a symbol stream that is transferred using a multilevel transmission channel, a method comprising:

in relation to said transfer, representing said symbols in a digital bitwise form such that each symbol is presented as a given plurality of bits where each bit in the given plurality of bits is subject to a different probability of error; and applying an error correction procedure to each one of the given plurality of bits, for the bitwise digital form of each symbol that is transferred as part of the symbol stream, based on the different error probability that is associated with each bit in the given plurality of bits such that an error correction power is associated with each one of the given plurality of bits and the error correction power for any one bit of the given plurality of bits is different than another error correction power that is associated with any other one of the given plurality of bits and all the symbols of the symbol stream are recoverable subject to the error correction power to compensate at least for channel induced errors.

2. The method of claim 1 wherein said error correction procedure includes:

for the bitwise digital form of each symbol to be transferred, encoding each bit of the given plurality of bits to apply a customized encoding to each one of the given plurality of bits which is based on a bit error rate that is different for each one of the given plurality of bits for use as encoded symbols;

passing the encoded symbols to the multilevel transmission channel as said symbol stream; receiving the encoded symbols from the multilevel transmission channel; and decoding the encoded symbols, as received from the multilevel transmission channel, in a way that applies a customized decoding to each one of given plurality of bits, based on the bit error rate for each one of the given plurality of bits, to restore the symbols to said digital bitwise form and to recover the symbol stream by removing said customized encoding.

3. In a system which uses a plurality of levels to represent a corresponding plurality of symbols, respectively, in a symbol stream and where each one of the plurality of symbols represents more than one bit of information, a method comprising:
   converting each one of the symbols to a digitally encoded value using a given plurality of bits such that each bit in the given plurality of bits is subject to a different probability of error; and
   encoding the given plurality of bits for each symbol based on the different probability of error for each bit in the given plurality of bits to subject at least one bit of each symbol to a correction power that is different than another correction power for another bit of the symbol thereby producing an error corrected digitally encoded value corresponding to each symbol for subsequent recovery of each symbol as part of the symbol stream.

4. The method of claim 3, further comprising:
   transferring the digitally encoded value of each symbol to a multilevel transmission medium;
   receiving the digitally encoded value of each symbol from the multilevel transmission medium;
   decoding each digitally encoded value based on the different probability of error for each bit in the given plurality of bits to remove the encoding from each bit in the given plurality of bits to recover the symbol stream after transfer through said multilevel transmission medium.

5. The method of claim 3 wherein said encoding and said decoding includes applying a different error correction power to each bit of the given plurality of bits of each symbol that is based on the bit error rate of each bit in the given plurality of bits.

6. In a system which uses multi-level data encoding where each symbol of a plurality of symbols represents more than one bit of information in a symbol stream that is transferred using a multilevel transmission channel, an apparatus comprising:
   a first arrangement for representing said symbols in a digital bitwise form, in relation to said transfer, such that each symbol is presented as a given plurality of bits where each bit in the given plurality of bits is subject to a different probability of error; and
   a second arrangement for applying an error correction procedure to each one of the given plurality of bits, for the bitwise digital form of each symbol that is transferred as part of the symbol stream, based on the different error probability that is associated with each bit in the given plurality of bits such that an error correction power is associated with each one of the given plurality of bits and the error correction power for any one bit of the given plurality of bits is different than another error correction power that is associated with any other one of the given plurality of bits and all the symbols of the symbol stream are recoverable subject to the error correction power to compensate at least for channel induced errors.

7. The apparatus of claim 6 wherein said second arrangement is configured to apply said error correction procedure by encoding each bit of the given plurality of bits, for the bitwise digital form of each symbol to be transferred, to apply a customized encoding to each one of the given plurality of bits which is based on a bit error rate that is different for each one of the given plurality of bits for use as encoded symbols and for passing the encoded symbols to the multilevel transmission channel as said symbol stream and said second arrangement is further configured for receiving the encoded symbols from the multilevel transmission channel and, thereafter, decoding the encoded symbols in a way that applies a customized decoding to each one of given plurality of bits, based on the bit error rate for each one of the given plurality of bits, to restore the symbols to said digital bitwise form and to recover the symbol stream by removing said customized encoding.

8. In a system which uses multi-level data encoding where each one of a plurality of symbols represents more than one bit of information in a symbol stream, a method comprising:
   converting the symbols of the symbol stream to a corresponding bit stream in which each symbol is represented using a given plurality of bits such that each bit in the given plurality of bits is subject to a different probability of error; and
   encoding the bit stream based on the different probability of error for each bit in the given plurality of bits to form an encoded bit stream for transmission and all the symbols of the symbol stream are recoverable subject to decoding to compensate at least for errors induced by the transmission.

9. In a system which uses multi-level data encoding where each symbol of a plurality of user data symbols represents more than one bit of information in a user data symbol stream for transfer using a multilevel transmission channel, a method comprising:
   in relation to said transfer, representing said user data symbols in a digital bitwise form such that each symbol is presented as a plurality of bits where each bit in the plurality of bits is subject to a different probability of error; and
   applying an error correction procedure to the plurality of bits, for the bitwise digital form of each user data symbol that is transferred as part of the symbol stream, based on the different error probability that is associated with each bit in the plurality of bits such that an error correction power for at least one bit of the plurality of bits is different than another error correction power that is associated with another one of the plurality of bits and all the symbols of the symbol stream are recoverable subject to the error correction power to compensate at least for channel induced errors.

10. The method of claim 9 wherein said error correction procedure includes:
    for the bitwise digital form of each symbol to be transferred, the error correction procedure includes (i) encoding each bit of the plurality of bits to apply a customized encoding to at least a selected one of the plurality of bits which is based on a bit error rate that is different for each one of the plurality of bits for use as encoded symbols, (ii) passing the encoded symbols to the multilevel transmission channel as said symbol stream, (iii) receiving the encoded symbols from the multilevel transmission channel, and (iv) decoding the encoded symbols, as received from the multilevel transmission channel, in a way that applies a customized decoding to at least the selected one of the plurality of bits, based on the bit error rate for each one of the plurality of bits, to restore the symbols to said digital bitwise form and to remove said customized encoding in a way which cooperates with the customized encoding to provide a customized error correction power that is different from another error correction power that is associated with at least one other one of the plurality of bits thereby recovering the symbol stream.

11. The method of claim 10 wherein said customized error correction power is applied to a lowest order bit of the plurality of bits such that the customized error correction power is higher for the lowest order bit as compared to the error correction power associated with any other bit in the plurality of bits.

12. The method of claim 11 including applying a convolutional code to the lowest order bit and applying a constellation mapping collectively to the other bits.

13. In a system which uses multi-level data encoding where each symbol of a plurality of symbols represents more than one bit of information in a symbol stream that is transferred using a multilevel transmission channel, an apparatus comprising:
   a first arrangement for representing said symbols in a digital bitwise form, in relation to said transfer, such that each symbol is presented as a plurality of bits where each bit in the plurality of bits is subject to a different probability of error; and
   a second arrangement for applying an error correction procedure to at least a selected one of the plurality of bits, for the bitwise digital form of each symbol that is transferred as part of the symbol stream, based on the different error probability that is associated with each bit in the plurality of bits such that an error correction power is associated with the selected one of the plurality of bits and the error correction power for at least the selected bit is different than another error correction power that is associated with at least one other one of the plurality of bits and all the symbols of the symbol stream are recoverable subject to the error correction power to compensate at least for channel induced errors.

14. The apparatus of claim 13 wherein said second arrangement is configured to apply said customized error correction procedure by encoding each bit of the plurality of bits, for the bitwise digital form of each symbol to be transferred, to apply a customized encoding to at least a selected one of the plurality of bits which is based on a bit error rate that is different for each one of the given plurality of bits for use as encoded symbols and for passing the encoded symbols to the multilevel transmission channel as said symbol stream and said second arrangement is further configured for receiving the encoded symbols from the multilevel transmission channel and, thereafter, decoding the encoded symbols in a way that applies a customized decoding at least to the selected one of the plurality of bits, based on the bit error rate for each one of the plurality of bits, to restore the symbols to said digital bitwise form and to remove said customized encoding thereby recovering the symbol stream.

15. In a system which uses a multilevel transmission channel for transferring user data, a method comprising:
   configuring the multilevel transmission channel to support a plurality of bitwise data symbols, each of which bitwise data symbols represents more than one bit of information such that each bitwise data symbol is made up of a plurality of bits where each bit in the plurality of bits is subject to a different probability of error;
   applying a mosaic data structure to the bitwise data symbols of the multilevel channel based on said different probability of error for each bit, which mosaic data structure is formed of an arrangement of mosaic tiles, and each of which mosaic tiles is configured for receiving a channel symbol such that at least a selected one of the mosaic tiles is characterized by a collective error probability based on the error probability of a selected group of said bits assigned to the selected mosaic tile which is different than another collective error probability that characterizes at least one other one of the mosaic tiles based a different group of said bits assigned to the other mosaic tile;
   encoding the user data into the channel symbols in a way which provides an error correction power for correction of one or more errors in at least some of said channel symbols, which errors are caused by the transfer through the multilevel channel;
   introducing the channel symbols into the mosaic tiles; and
   thereafter, recovering the user data from the channel symbols such that the error correction power of said encoding is applied by a selected amount to at least the selected one of the plurality of bits and by a different amount to at least one other one of the plurality of bits for correcting errors that occur within the selected group of bits in the selected mosaic tile.

16. The method of claim 15 wherein each bitwise data symbol includes a least significant bit and said applying includes assigning the selected group of bits in the selected mosaic tile exclusively as least significant bits.

17. The method of claim 16 including configuring said mosaic tiles in a pattern that repeats based, at least in part, on a number of bits that said selected mosaic tile contains in the selected group of bits.

18. The method of claim 15 including arranging the selected mosaic tile such that the collective error probability for the selected mosaic tile is a maximum error probability with respect to all of the mosaic tiles.

19. The method of claim 18 wherein said encoding is configured for correcting multiple bit errors in up to a given number of the channel symbols such that correction of such multiple bit errors in the selected mosaic tile compensates for the maximum error probability of the selected mosaic tile.

20. The method of claim 15 including applying a convolutional code to said selected one of the mosaic tiles to provide an additional error correction power for the selected one of the mosaic tiles.

21. The method of claim 20 including configuring the selected mosaic tile with one or more additional redundancy bits as compared to at least one other mosaic tile.

22. The method of claim 21 including using a trellis coded modulation as the convolutional code to generate the one or more additional redundancy bits.

23. The method of claim 15 including repeating the mosaic data structure in the multilevel channel responsive to introducing the channel symbols into the mosaic tiles and said method further comprising dividing the user data into a plurality of interleaves and said introducing the channel symbols into the mosaic tiles includes rotating each interleave through each position in the mosaic data structure with said repeating of the mosaic data structure.

* * * * *

UNITED STATES PATENT AND TRADEMARK OFFICE
CERTIFICATE OF CORRECTION

PATENT NO. : 8,627,165 B2
APPLICATION NO. : 12/403546
DATED : January 7, 2014
INVENTOR(S) : Bruce A. Liikanen et al.

Page 1 of 1

It is certified that error appears in the above-identified patent and that said Letters Patent is hereby corrected as shown below:

In the Specifications

Column 1, line 9, a --.-- should appear after the word reference as follows:

reference.

In the Claims

Column 36, line 8, insert the word --on-- between the words based and a as follows:

tiles based on a different group of said bits assigned to the

Signed and Sealed this
Twenty-second Day of April, 2014

Michelle K. Lee
*Deputy Director of the United States Patent and Trademark Office*